(12) United States Patent
Nelson

(10) Patent No.: US 11,270,551 B2
(45) Date of Patent: Mar. 8, 2022

(54) PAIRING AUGMENTED REALITY DEVICES WITH ELECTRONIC GAMING MACHINES

(71) Applicant: IGT, Las Vegas, NV (US)

(72) Inventor: Dwayne Nelson, Las Vegas, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 16/923,381

(22) Filed: Jul. 8, 2020

(65) Prior Publication Data

US 2021/0043032 A1    Feb. 11, 2021

Related U.S. Application Data

(63) Continuation of application No. 16/135,154, filed on Sep. 19, 2018, now abandoned.

(51) Int. Cl.
*G07F 17/32* (2006.01)
*G06T 19/00* (2011.01)

(52) U.S. Cl.
CPC ........ *G07F 17/3211* (2013.01); *G06T 19/006* (2013.01); *G07F 17/3216* (2013.01); *G07F 17/3223* (2013.01)

(58) Field of Classification Search
CPC ............. G07F 17/3211; G07F 17/3216; G07F 17/3223; G06T 19/006
See application file for complete search history.

(56) References Cited

U.S. PATENT DOCUMENTS

| | | |
|---|---|---|
| 8,235,529 B1 | 8/2012 | Raffle et al. |
| 8,558,759 B1 | 10/2013 | Prada et al. |
| 8,821,274 B2 | 9/2014 | Lyons et al. |
| 8,943,420 B2 | 1/2015 | Goldthwaite et al. |
| 9,280,867 B2 | 3/2016 | Froy et al. |
| 9,280,868 B2 | 3/2016 | Froy et al. |
| 9,285,592 B2 | 3/2016 | Olsson et al. |
| 9,412,201 B2 | 8/2016 | Kinnebrew et al. |
| 9,558,612 B2 | 1/2017 | Lyons et al. |
| 9,568,620 B2 | 1/2017 | Froy et al. |
| 9,569,920 B2 | 2/2017 | Froy et al. |
| 2014/0121015 A1 | 5/2014 | Massing et al. |
| 2014/0168261 A1 | 6/2014 | Margolis et al. |
| 2015/0126279 A1* | 5/2015 | Lyons ................. G07F 17/3218 463/33 |
| 2016/0019746 A1* | 1/2016 | Lyons ................. G07F 17/3211 463/25 |
| 2016/0373570 A1 | 12/2016 | Scavezze et al. |

* cited by examiner

*Primary Examiner* — Werner G Garner
(74) *Attorney, Agent, or Firm* — Sage Patent Group

(57) ABSTRACT

An augmented reality (AR) viewing device includes a processor circuit and a memory including computer readable instructions that cause the processor circuit to generate an image of the EGM, obtain, based on the image of the EGM, a network address associated with the EGM, transmit a registration message to the network address associated with the EGM, and receive a registration response from the EGM in response to the registration message.

20 Claims, 23 Drawing Sheets

PAIRING AUGMENTED REALITY DEVICES WITH ELECTRONIC GAMING MACHINES

PRIORITY CLAIM

This application is a continuation of, and claims priority to and the benefit of, U.S. patent application Ser. No. 16/135,154, which was filed on Sep. 19, 2018, the entire contents of which is incorporated by reference herein.

BACKGROUND

Embodiments described herein relate to augmented reality systems and methods, and in particular to augmented reality systems and methods for use in connection with gaming.

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three-dimensional display screens.

BRIEF SUMMARY

An augmented reality (AR) viewing device according to some embodiments includes a processor circuit, a memory coupled to the processor circuit, a wireless transceiver coupled to the processor circuit, and a camera coupled to the processor circuit. The memory includes computer readable instructions that cause the processor circuit to generate an image of the EGM using the camera, obtain, based on the image of the EGM, a network address associated with the EGM, transmit a registration message using the wireless transceiver to the network address associated with the EGM, and receive a registration response using the wireless transceiver from the EGM in response to the registration message.

A method of pairing an augmented reality (AR) viewing device including a camera with an electronic gaming machine (EGM) includes generating an image of the EGM using the camera, obtaining, based on the image of the EGM, a network address associated with the EGM, transmitting a registration message to the network address associated with the EGM, and receiving a registration response from the EGM in response to the registration message.

A method of pairing an augmented reality viewing device including a camera with an electronic gaming machine according to some embodiments includes sending an inquiry signal via a short range wireless communication link, receiving a response to the inquiry signal via the short range wireless communication link from the EGM, wherein the response may include a network address of the EGM on the short range wireless communication link, generating an image of the EGM using the camera, obtaining confirmation that a user of the AR device wishes to pair the AR device with the EGM in the image, and confirming based on the image that the EGM is the EGM that the user of the AR device wishes to pair with the AR device.

A host computer system according to some embodiments includes a processor circuit, a memory coupled to the processor circuit, and a transceiver coupled to the processor circuit. The memory includes computer readable instructions that cause the processor circuit to receive, via the transceiver, an image of an EGM from the AR device, identify the EGM based on the image of the EGM, and transmit, via the transceiver, identity information regarding the EGM to the AR device.

A method, by a host computer system, of pairing an augmented reality viewing device including a camera with an electronic gaming machine according to some embodiments includes receiving an image of an EGM from the AR device, identifying the EGM based on the image of the EGM, and transmitting identity information regarding the EGM to the AR device.

A method, by an electronic gaming machine, of pairing an augmented reality viewing device including a camera with the EGM according to some embodiments includes receiving a request to display a confirmation graphic, displaying the confirmation graphic, receiving a pairing request from the AR device, and pairing with the AR device in response to the pairing request.

DETAILED DESCRIPTION

Embodiments of the inventive concepts provide systems and methods for displaying three-dimensional content on or in connection with an electronic gaming machine (EGM), or even independently from an EGM, to a player of an EGM or an observer (non-player) who is watching a player play an EGM. The three dimensional content may be associated with two-dimensional content that is displayed on the EGM. According to various embodiments, the 3D content can be rendered to the player on an augmented reality viewer, such as an augmented reality headset that communicates with the EGM so that the 3D content displayed to the player on the augmented reality headset is coordinated with the 2D content displayed on the EGM. "Augmented reality" may also be referred to as "mixed reality."

Some embodiments provide a headset display with pass through mixed reality rendering and which supports room scanning to generate a 3D model of an area around a user of the headset. The 3D model and 3D scanner can be used to track and locate objects, such as a user, a user's hand, other players, EGMs, etc., within an area, such as a casino floor. The headset display allows the user to see 3D virtual objects that appear to be physically present in the real world. The headset display also allows the user move around while 3D rendered virtual objects (e.g. interface buttons, avatars, videos, personally pinned alerts/notifications/statistics etc.) may appear to stay in place or move along with the player.

In particular embodiments, a casino operator or patron may use a mixed reality headset display to obtain information about a player in the casino.

These and other embodiments are described in more detail below.

Augmented Reality EGM Systems and Viewers

Figure 1:
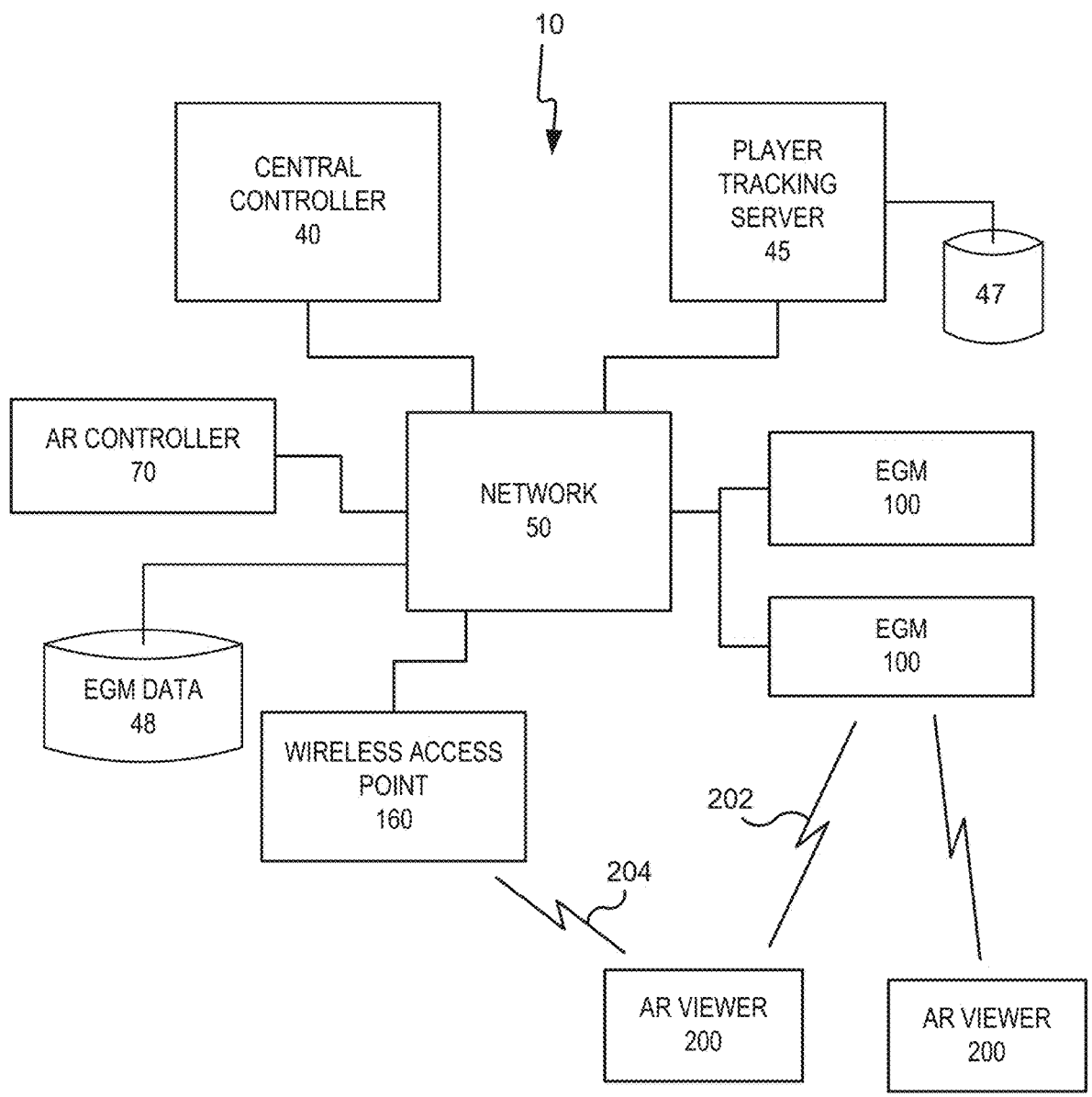
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 40 through a data network or remote communication link 50. The data communication network 50 may be a private data communication network that is operated, for example, by the gaming facility that operates the EGM 100. Communications over the data communication network 50 may be encrypted for security. The central controller 40 may be any suitable server or computing device which includes at least one processor circuit and at least one memory or storage device. Each EGM 100 may include a processor circuit that transmits and receives events, messages, commands or any other suitable data or signal between the EGM 100 and the central controller 40. The EGM processor circuit is operable to execute such communicated events, messages or commands in conjunction with the operation of the EGM. Moreover, the processor circuit of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processor circuits. Moreover, in some embodiments, one or more of the functions of one or more EGM processor circuits as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

An EGM database 48 that stores EGM information about EGMs 100 in the gaming environment may be connected to the network 50 and may be accessible to one or more other devices, such as the AR controller 70, the central controller 40, the EGMs 100 and/or the AR devices 200, as will be discussed in more detail below.

As further illustrated in FIG. 1, a mixed reality viewer 200, or AR viewer 200, is provided. The AR viewer 200 communicates with one or more elements of the system 10 to render two dimensional (2D) and/or three dimensional (3D) content to a player of one of the EGMs 100 in a virtual space, while at the same time allowing the player to see objects in the real space around the player. That is, the AR viewer 200 combines a virtual image with real images perceived by the user, including images of real objects as well as images displayed by the EGM 100. In this manner, the AR viewer 200 "mixes" real and virtual reality into a single viewing experience for the player. In some embodiments, the AR viewer 200 may be further configured to enable the player to interact with both the real and virtual objects displayed to the player by the AR viewer 200.

The AR viewer 200 communicates with one or more elements of the system 10 to coordinate the rendering of mixed reality images, and in some embodiments mixed reality 3D images, to the player. For example, in some embodiments, the AR viewer 200 may communicate directly with an EGM 100 over a wireless interface 202, which may be a WiFi link, a Bluetooth link, an NFC link, etc. In other embodiments, the AR viewer 200 may communicate with the data communication network 50 (and devices connected thereto, including EGMs) over a wireless interface 204 with the wireless access point 160. The wireless interface 204 may include a WiFi link, a Bluetooth link, an NFC link, etc. In still further embodiments, the AR viewer 200 may communicate simultaneously with both the EGM 100 over the wireless interface 202 and the wireless access point 160 over the wireless interface 204. In these embodiments, the wireless interface 202 and the wireless interface 204 may use different communication protocols and/or different communication resources, such as different frequencies, time slots, spreading codes, etc. For example, in some embodiments, the wireless interface 202 may be a Bluetooth link, while the wireless interface 204 may be a WiFi link.

The wireless interfaces 202, 204 allow the AR viewer 200 to coordinate the generation and rendering of mixed reality images to the player via the AR viewer 200.

In some embodiments, the gaming system 10 includes a mixed reality controller, or AR controller 70. The AR controller 70 may be a computing system that communicates through the data communication network 50 with the EGMs 100 and the AR viewers 200 to coordinate the generation and rendering of virtual images to one or more players using the AR viewers 200. The AR controller 70 may be implemented within or separately from the central controller 40.

In some embodiments, the AR controller 70 may coordinate the generation and display of the virtual images of the same virtual object to more than one player by more than one AR viewer 200. As described in more detail below, this may enable multiple players to interact with the same virtual object together in real time. This feature can be used to provide a shared multiplayer experience to multiple players at the same time.

Moreover, in some embodiments, the AR controller 70 may coordinate the generation and display of the same virtual object to players at different physical locations, as will be described in more detail below.

The AR controller 70 may store a three dimensional wireframe map of a gaming area, such as a casino floor, and may provide the three dimensional wireframe map to the AR viewers 200. The wireframe map may store various information about EGMs in the gaming area, such as the identity, type and location of various types of EGMs. The three dimensional wireframe map may enable an AR viewer 200 to more quickly and accurately determine its position and/or orientation within the gaming area, and also may enable the AR viewer 200 to assist the player in navigating the gaming area while using the AR viewer 200. The generation of three dimensional wireframe maps is described in more detail below.

In some embodiments, at least some processing of virtual images and/or objects that are rendered by the AR viewers 200 may be performed by the AR controller 70, thereby offloading at least some processing requirements from the AR viewers 200.

An AR viewer 200 may communicate with the back bet server 60 through the wireless interface 204 and network 50.

Referring to FIGS. 2A to 2D, the AR viewer 200 may be implemented in a number of different ways. For example, referring to FIG. 2A, in some embodiments, an AR viewer 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The AR viewer 200A may be implemented, for example, using a Hololens™ from Microsoft Corporation. The Microsoft Hololens includes a plurality of cameras and other sensors 211 that the device uses to build a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
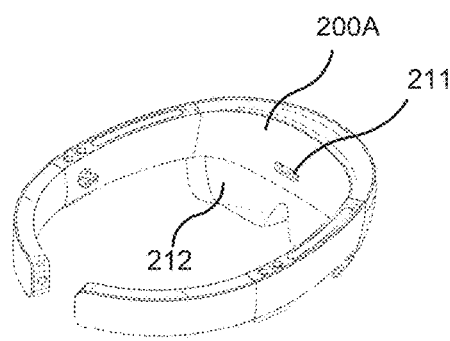
FIGS. 2A to 2D illustrate mixed reality viewers according to various embodiments.
Figure 2B:
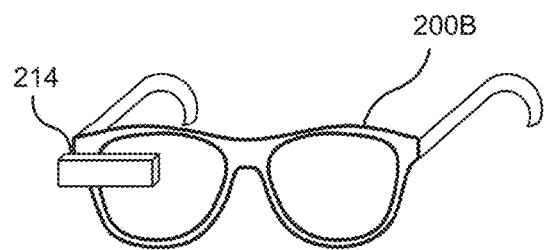

Referring to FIG. 2B, an AR viewer 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
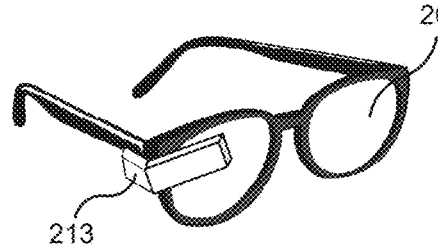
Figure 2D:
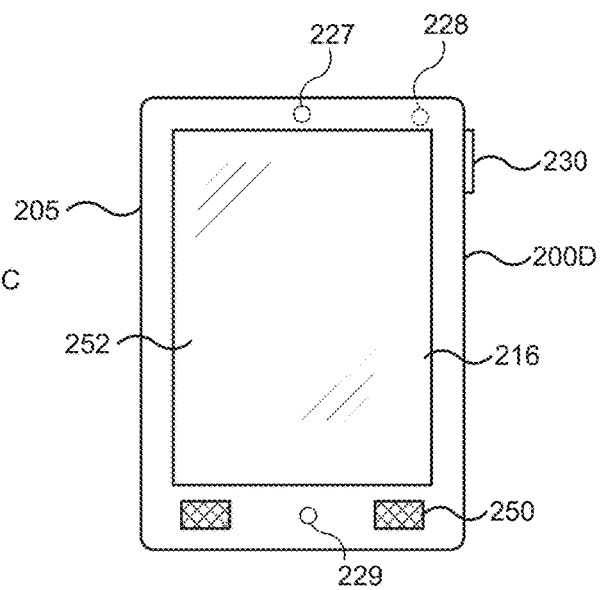

In other embodiments, referring to FIG. 2C, the AR viewer may be implemented using a virtual retinal display device 200C. In contrast to devices that display an image within the field of view of the user, a virtual retinal display raster 213 scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR viewer 200D may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
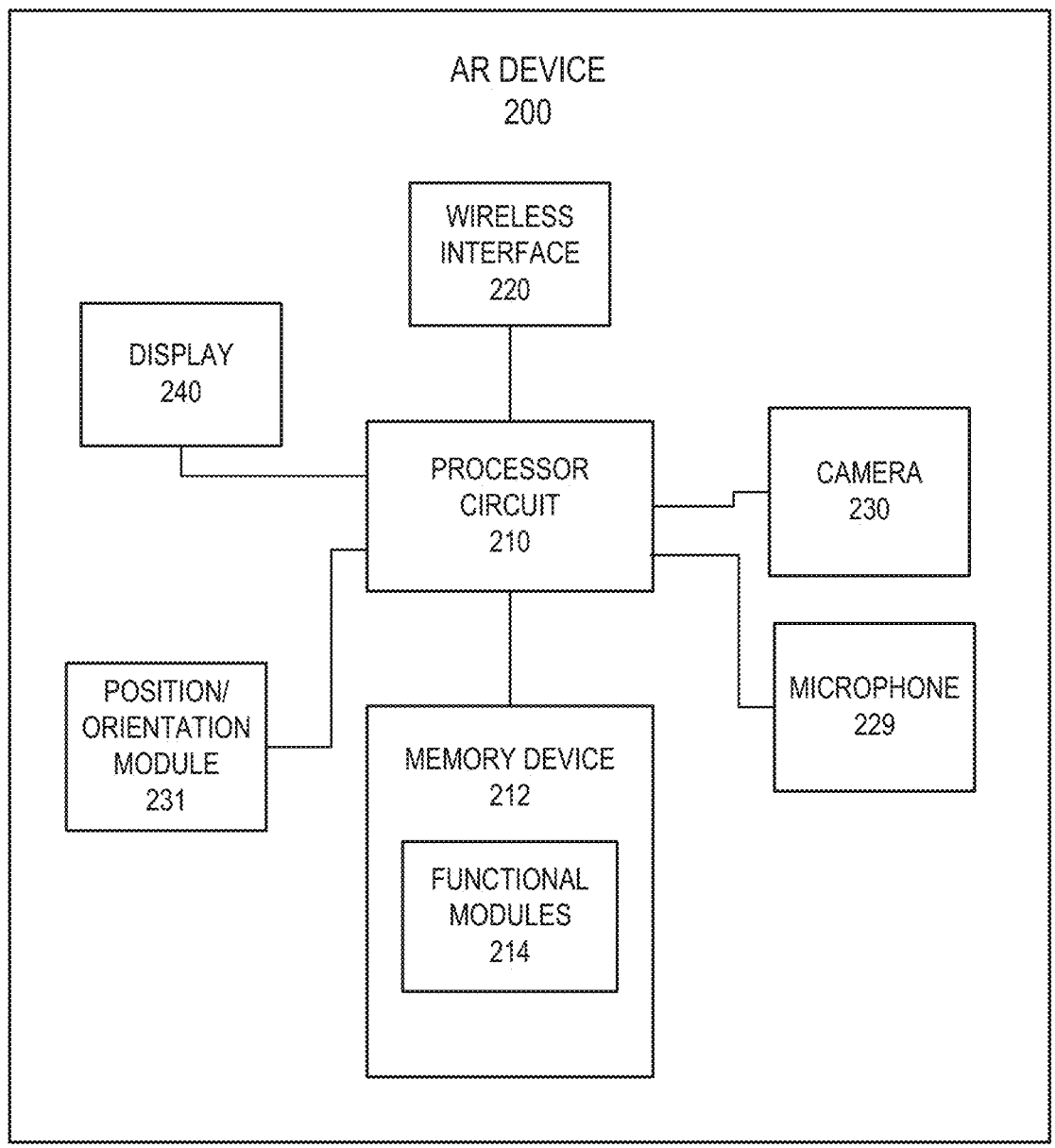
FIG. 2E is a schematic block diagram of an augmented reality device according to some embodiments.

FIG. 2E is a block diagram that illustrates various components of an AR viewer 200 according to some embodiment. As shown in FIG. 2E, the AR viewer 200 may include a processor circuit 210 that controls operations of the AR viewer 200. Although illustrated as a single processor circuit, multiple special purpose and/or general purpose processor circuits and/or processor circuit cores may be provided in the AR viewer 200. For example, the AR viewer 200 may include one or more of a video processor, a signal processor, a sound processor and/or a communication controller that performs one or more control functions within the AR viewer 200. The processor circuit 210 may be variously referred to as a "controller," "microcontroller," "microprocessor" or simply a "computer." The processor circuit may further include one or more application-specific integrated circuits (ASICs).

Various components of the AR viewer 200 are illustrated in FIG. 2E as being connected to the processor circuit 210. It will be appreciated that the components may be connected to the processor circuit 210 through a system bus, a communication bus and controller, such as a USB controller and USB bus, a network interface, or any other suitable type of connection.

The AR viewer 200 further includes a camera 230 for generating a video signal and a display 240 for displaying AR graphics to a user as virtual images or virtual elements, and a microphone 229 for receiving audio signals, such as voice commands from a user. The AR graphics may be displayed directly within a field of view so as to appear to be present within a scene and/or may be digitally added to a live video signal so as to appear to be present within the live video signal.

The AR viewer 200 may further include a position/orientation module 231 that is configured to provide information about a position and/or orientation of the AR viewer 200. Such information may be provided, for example, using a global positioning system (GPS) unit and/or via cellular or WiFi-assisted positioning that may use triangulation with known base stations using, for example, a received signal strength indicator (RSSI) signal. The position/orientation module 231 may further include one or more accelerometers and/or a magnetometer (compass) that can be used to determine a physical orientation of the AR viewer 200.

The AR viewer 200 further includes a memory device 212 that stores one or more functional modules 214 for performing the operations described herein.

The memory device 212 may store program code and instructions, executable by the processor circuit 210, to control the AR viewer 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semi-conductor memory may operate in conjunction with the gaming device disclosed herein.

The AR viewer 200 may include a wireless interface 220 including wireless transceiver circuitry that enables the AR viewer 200 to communicate with remote devices, such as EGMs 100 and/or an AR controller 70 over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

3D Environment Generation

Figure 3A:
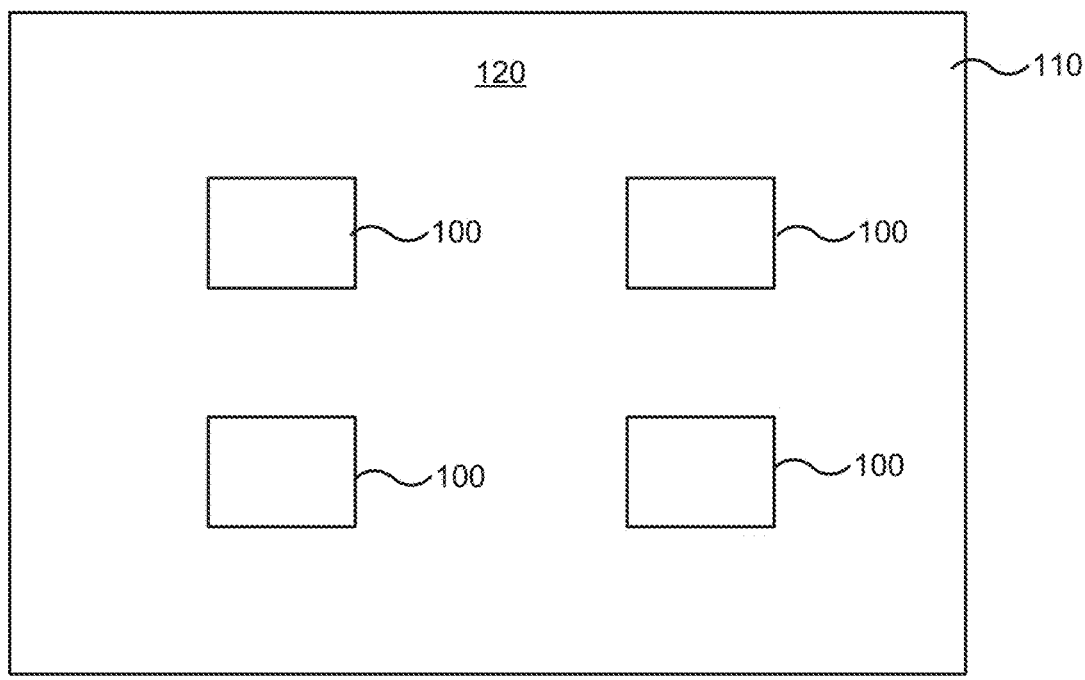
FIG. 3A is a map of a gaming area, such as a casino floor.

FIG. 3A illustrates, in plan view, an example map 110 of a gaming area 120. The gaming area 120 may, for example, be a casino floor. The map 110 shows the location of a plurality of EGMs 100 within the gaming area 120. As will be appreciated, the locations of the EGMs 100 within a gaming area 120 are generally fixed, although a casino operator may relocate EGMs from time to time, such as when new EGMs are introduced, to create new traffic flow patterns within the gaming area 120, to feature or highlight certain games, etc. As noted above, in order to assist the operation of the AR viewers 200, the AR controller 70 may store a three dimensional wireframe map of the gaming area 120, and may provide the three dimensional wireframe map to the AR viewers 200.

Figure 3B:
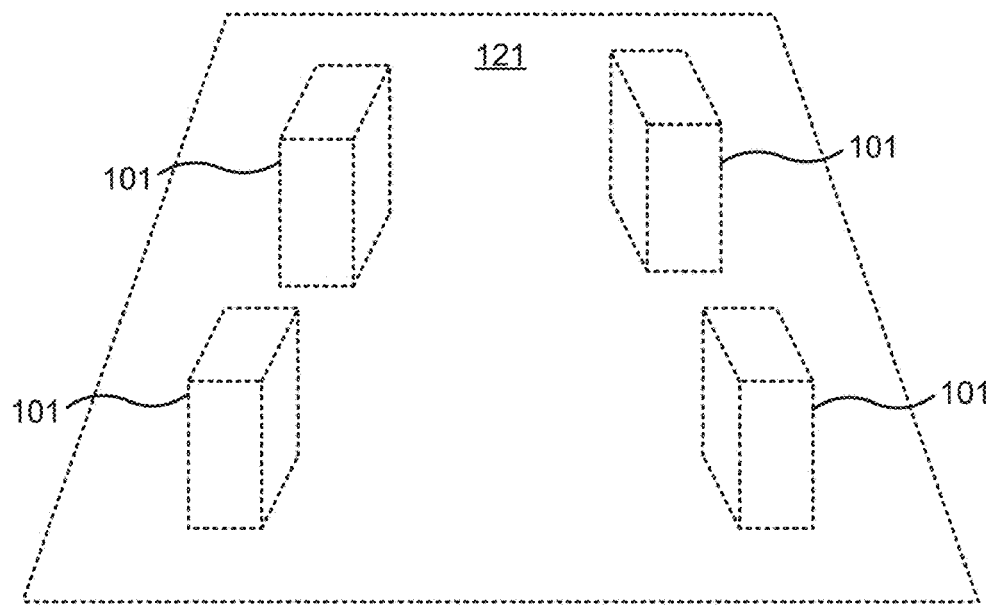
FIG. 3B illustrates a three-dimensional wireframe model of the gaming area of FIG. 3A.

An example of a wireframe map 121 is shown in FIG. 3B. The wireframe map is a three-dimensional model of the gaming area 120. As shown in FIG. 3B, the wireframe map 121 includes wireframe models 101 corresponding to the EGMs 100 that are physically in the gaming area 120. The wireframe models 101 may be pregenerated to correspond to various EGM form factors, such as single display EGMs, mechanical slot EGMs, dual display EGMs, etc. The pre-generated models may then be placed into the wireframe map, for example, by a designer or other personnel. The wireframe map 121 may be updated whenever the physical location of EGMs in the gaming area 120 is changed.

In some embodiments, the wireframe map 121 may be generated automatically using an AR viewer 200, such as a 3D headset, that is configured to perform a three-dimensional depth scan of its surroundings and generate a three dimensional model based on the scan results. Thus, for example, an operator using an AR viewer 200A (FIG. 2A) may perform a walkthrough of the gaming area 120 while the AR viewer 200A builds the 3D map of the gaming area.

The three dimensional wireframe map 121 may enable an AR viewer 200 to more quickly and accurately determine its position and/or orientation within the gaming area. For example, an AR viewer 200 may determine its location within the gaming area 120 using one or more position/orientation sensors. The AR viewer 200 then builds a three dimensional map of its surroundings using depth scanning, and compares its sensed location relative to objects within the generated three dimensional map with an expected location based on the location of corresponding objects within the wireframe map 121. The AR viewer 200 may calibrate or refine its position/orientation determination by comparing the sensed position of objects with the expected position of objects based on the wireframe map 121. Moreover, because the AR viewer 200 has access to the wireframe map 121 of the entire gaming area 120, the AR viewer 200 can be aware of objects or destinations within the gaming area 120 that it has not itself scanned. Processing requirements on the AR viewer 200 may also be reduced because the wireframe map 121 is already available to the AR viewer 200.

In some embodiments, the wireframe map 121 may store various information about EGMs in the gaming area, such as the identity, type, orientation and location of various types of EGMs, the locations of exits, bathrooms, courtesy desks, cashiers, ATMs, ticket redemption machines, etc. Such information may be used by an AR viewer 200 to help the user navigate the gaming area. For example, if a user desires to find a destination within the gaming area, the user may ask the AR viewer 200 for directions using a built-in microphone and voice recognition function in the AR viewer 200 or use other hand gestures or eye/gaze controls tracked by the AR viewer 200 (instead of or in addition to voice control). The AR viewer 200 may process the request to identify the destination, and then may display a virtual object, such as a virtual path on the ground, virtual arrow, virtual sign, etc., to help the user to find the destination. In some embodiments, for example, the AR viewer 200 may display a halo or glow around the destination to highlight it for the user, or have virtual 3D sounds coming from it so players could more easily find the machine.

Mixed Reality Applications

A user of an AR viewer 200 may use the AR viewer to obtain information about players and/or EGMs on a casino gaming floor. The information may be displayed to the user on the AR viewer 200 in a number of different ways such as by displaying images on the AR viewer 200 that appear to be three dimensional or two dimensional elements of the scene as viewed through the AR viewer 200. In general, the type and/or amount of data that is displayed to the user may depend on what type of user is using the AR viewer 200 and, correspondingly, what level of permissions or access the user has. For example, an AR viewer 200 may be operated in one of a number of modes, such as a player mode, an observer mode or an operator mode. In a player mode, the AR viewer 200 may be used to display information about particular EGMs on a casino floor. The information may be generic information about an EGM or may be customized information about the EGM based on the identity or preferences of the user of the AR viewer 200. In an observer mode, the AR viewer 200 may be used to display information about particular EGMs on a casino floor or information about players of EGMs on the casino floor. In an operator mode, the AR viewer 200 may also be used to display information about particular EGMs on a casino floor or information about players of EGMs on the casino floor, but the information may be different or more extensive than the information displayed to an observer. Each of these situations is described in more detail below.

Figure 4A:
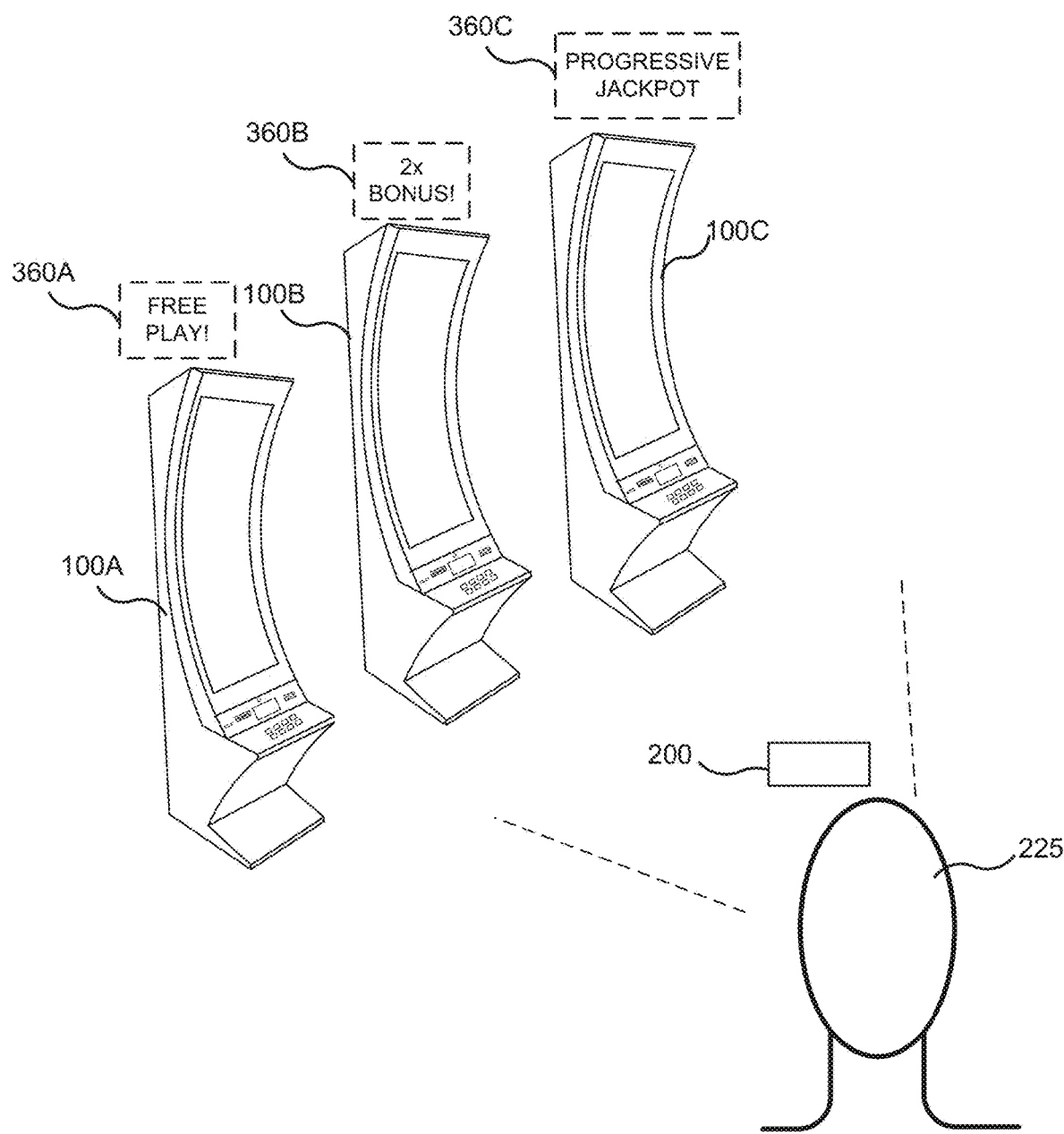
FIGS. 4A and 4B are perspective views illustrating players viewing groups of electronic gaming machines using an augmented reality viewer according to some embodiments.

FIG. 4A illustrates an example of the use of an AR viewer 200 in player mode. In the example shown in FIG. 4A, a player 225 may use an AR viewer 200 to view a casino floor area in which three EGMs 100A, 100B, 100C are located. The AR viewer 200 generates a live video signal of the casino floor including the three EGMs 100A, 100B, 100C, and using a digital map of the casino floor as described above, the AR viewer 200 may identify the three EGMs 100A, 100B, 100C. The AR viewer 200 may further communicate with the EGMs 100A, 100B, 100C over the wireless interface 202 and/or with the AR controller 70 over the wireless interface 204 shown in FIG. 1 to obtain information about the EGMs 100A, 100B, 100C, including information that is specific to the user of the AR viewer 200.

In some embodiments, the AR viewer 200 may transmit the live video signal and/or position/orientation data of the AR viewer 200 to the AR controller 70, and the AR controller 70 may use the video signal and/or the position/orientation data of the AR viewer 200 to identify EGMs visible in the live video signal. The AR controller 70 may provide information to the AR viewer 200 identifying the EGMs 100A, 100B, 100C along with information about the EGMs 100A, 100B, 100C that can be displayed on the AR viewer 200 as virtual images 360A, 360B, 360C in the video signal displayed to the user as illustrated in FIG. 4.

In some embodiments, the information about the EGMs 100A, 100B, 100C may include EGM-specific information that relates to features of the EGM, such as whether the EGM has a progressive jackpot associated with it (e.g., virtual image 360C) or that a special bonus or free play is being offered (e.g., virtual images 360A, 360B).

In some embodiments the information displayed on the AR viewer 200 may be specific to the player 225. For example, when the AR viewer 200 is activated, it may register with the AR controller 70. As part of the registration process, the AR viewer 200 may identify the player 225 that is using the AR viewer 200 to the AR controller 70. Using the player identification information provided by the AR viewer 200, the AR controller 70 may query the player tracking server 45 (FIG. 1) to obtain information about the player 225. The AR controller 70 may receive information from the player tracking server 45 about the player's reward status and/or past game play, and may generate special offers that are unique to the player 225 based on the player's reward status and/or past game play. Thus, for example, the AR controller 70 may determine that the player 225 is entitled to free play on a particular EGM 10A. The AR controller 70 communicates this to the AR viewer 200, which responsively displays the message 360A ("Free Play!") alongside the image of the EGM 10A in the video signal shown to the player 225.

Figure 4B:
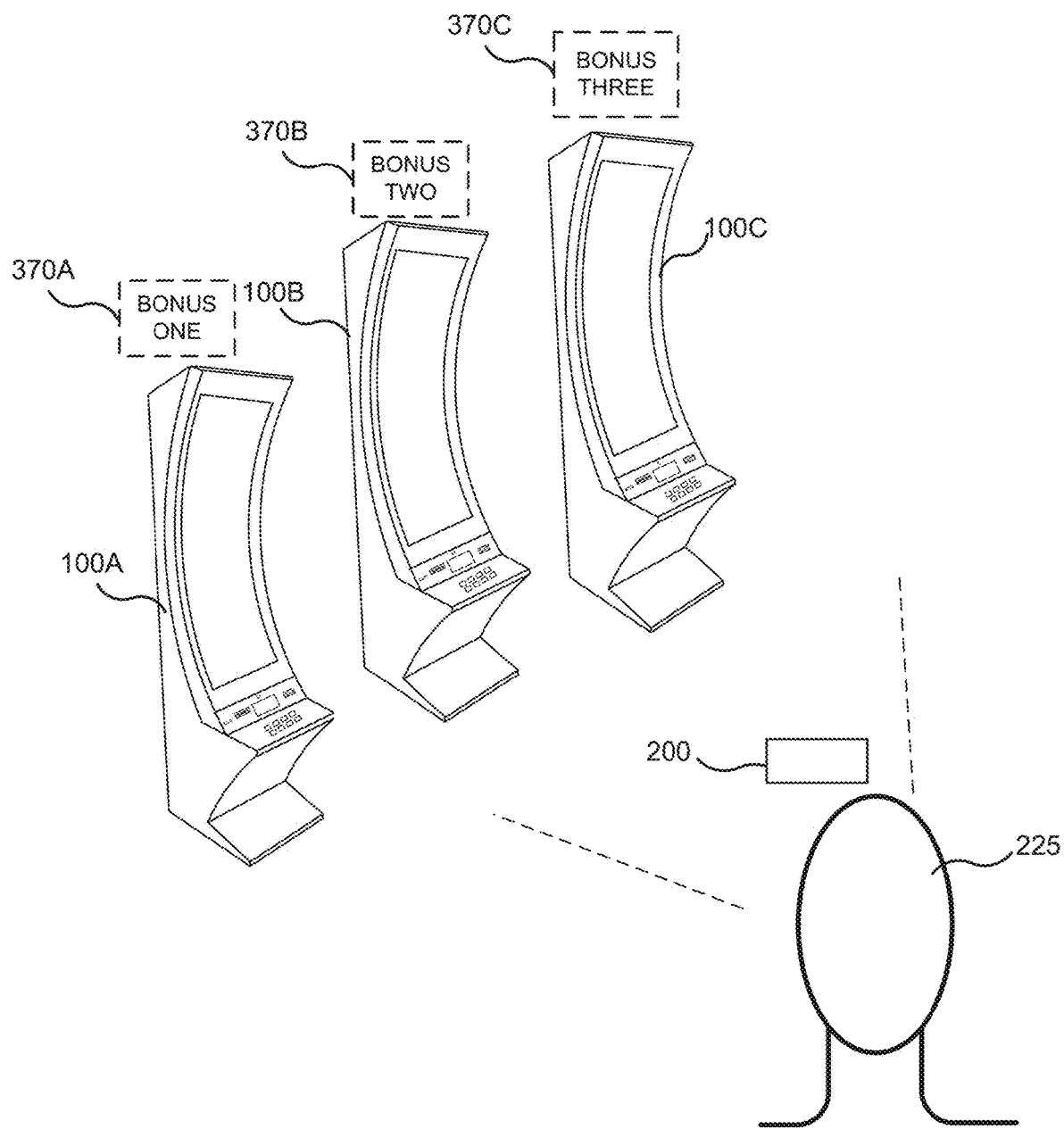

Referring to FIG. 4B, AR messages may be displayed to a player to entice the player to use different EGMs by, for example, offering bonuses to the player to play different EGMs, or to play EGMs in a particular order. For example, referring to FIG. 4B, an AR viewer 200 may display information to a player 225 indicating that progressive bonuses are available to the player on EGMs 100A, 100B, 100C if the player plays the EGMs in order. For example, informational messages 370A, 370B, 370C may be displayed to the player indicating that the player may be eligible for a first bonus by playing the first EGM 100A, a second bonus by playing the second EGM 100B, and a third bonus by playing the EGM 100C. The bonus may be made available if the player plays the EGMs for a predefined period of time or by wagering a predefined total amount on each EGM. The bonus may increase with each machine. In this manner, AR may be used to encourage a player to try new or different machines.

Still other informational messages about EGMs could be displayed to a player using AR informational messages, such as a total amount of player reward points that a player may earn for playing a particular machine, a countdown timer indicating how long a particular bonus, award or other promotion will last on a particular machine, etc.

Figure 5:
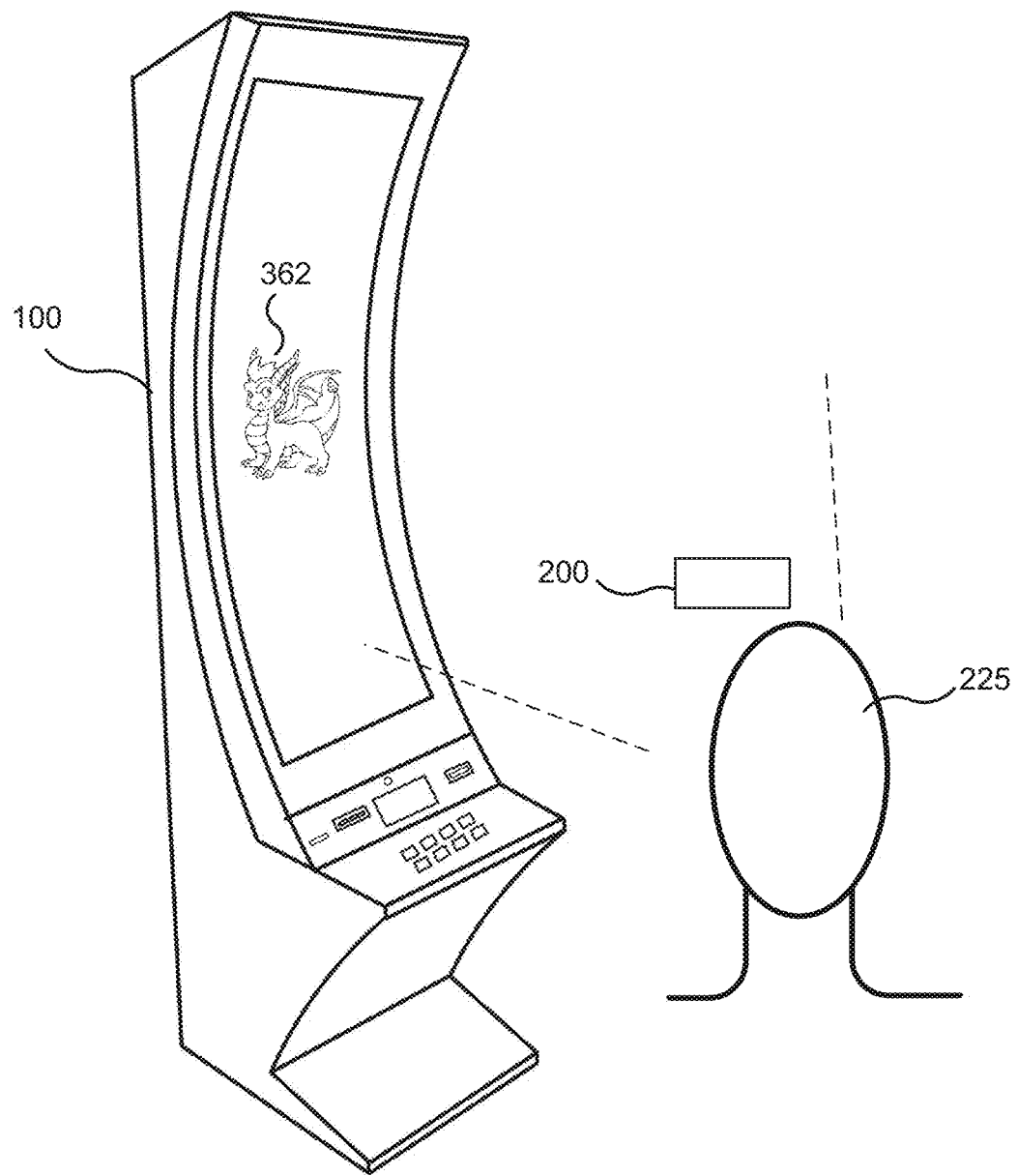
FIG. 5 illustrates an example of a view of an electronic gaming machine as seen using an augmented reality viewer according to some embodiments.

In some embodiments, as illustrated in FIG. 5, the AR viewer 200 may be used by a player 225 to interact with a game on an EGM 100, such as by displaying images or avatars associated with a game on an EGM 100A, such as the image 362, informational messages, or other information, before, during or after gameplay on an EGM.

Before an AR viewer 200 can interact with a particular EGM 100, the AR viewer 200 must establish a communication link, such as a wireless communication link, with the EGM 100. The establishment of a communication link between an AR viewer 200 and an EGM 100 may be referred to as "pairing" the devices. Because EGMs are typically arranged in close proximity with each other in a gaming environment, and because there are typically many other people in the gaming environment, pairing an AR viewer 200 with an EGM 100 may be important to ensure that the AR viewer 200 is interacting with the correct EGM 100, and that the EGM 100 is sending AR-related signals and information to the correct AR device. That is, when a player is in a gaming environment, such as on a casino floor, there will typically be many EGMs within the player's view at any given moment, and a player may wish to pair an AR viewer 200 with a particular machine that the player wishes to play.

One problem that may arise when pairing an EGM 100 and an AR viewer 200 is that the AR viewer 200 must identify a network or other address associated with a particular EGM 100 out of potentially a large number of closely arranged EGMs so that messages to/from the AR viewer 200 are sent/received from the correct EGM 100. Some embodiments described herein provide systems and/or methods for reliably and accurately pairing AR devices 200 with EGMs 100.

Figure 6A:
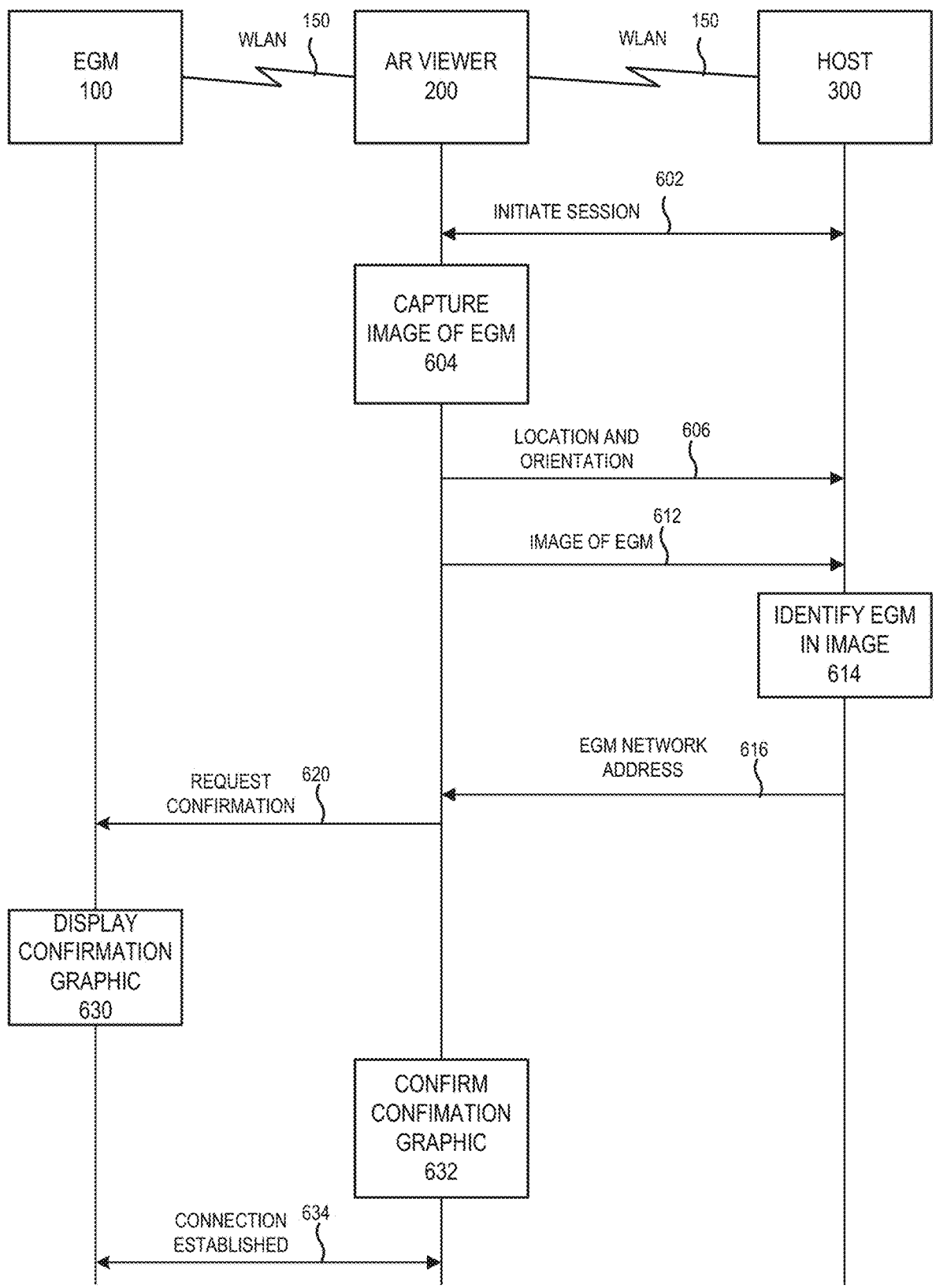
FIGS. 6A, 6B, 6C, 6D, 6E, and 6F are flow diagrams illustrating message flows according to some embodiments.

The communication link between an AR viewer 200 and an EGM 100 may be established using one of several wireless communication protocols, such as wireless Local Area Network (WLAN), or WiFi, connection protocol, a Bluetooth connection protocol, a Near Field Communication (NFC) connection protocol, etc. As will be described in more detail below, the connection may be established directly or indirectly between the EGM 100 and the AR viewer 200 or with or without the aid of a separate server, such as an AR controller 70, the central controller 40, or other remote host server 300, router or other hardware in various embodiments. For example, FIG. 6A is a flow diagram that illustrates embodiments in which a remote host server 300 assists in the pairing of an EGM 100 with an AR viewer 200 via a WLAN. The remote host server may be implemented by the central controller 40, the AR controller 70, or another host system connected to the network 50. In the embodiments illustrated in FIG. 6A, an AR viewer 200 and an EGM 100 both communicate with a remote host 300 via a wireless local area network (WLAN) 150. The WLAN 150 may include one or more base stations, routers, access points, or other infrastructure (not shown). Each of the AR viewer 200 and the EGM 100 may each have assigned a local IP address on the WLAN 150 (e.g., 10.10.1.280) which may be used to communicate with the device over the WLAN 150. Moreover, each of the AR viewer 200 and the EGM 100 may have a dedicated port over which EGM-related messages may be sent and/or received. Accordingly, a message may be sent from the AR viewer 200 to the EGM 100 using an IP address/port pair, such as 10.10.1.280:2000, where port 2000 has been configured in the EGM for receiving messages from an AR viewer 200.

According to some embodiments, an AR viewer 200 may initiate a data communication session 602 with a host device 300 (which may be the AR controller 70 or another host system operated by the game provider) whose IP address is configured in the AR viewer 200 via the WLAN 150. When a player wishes to interact with a particular EGM 100, the player may indicate his or her interest, for example, by looking at the EGM 100 and speaking a command to the AR viewer 200 (e.g., "connect me to that game") via the microphone 229. The AR viewer 200 may visually confirm which EGM 100 the player is referring to, for example, by displaying an AR graphic to the player on or around the EGM 100, such as a halo graphic that appears to light up the outline of the EGM 100. The AR viewer 200 may ask for voice confirmation from the player of the selection, and following such confirmation, may capture an image of the EGM 100 via the camera 230. The AR viewer 200 may also obtain position and orientation information of the AR viewer 200 at the time the image was captured, such as by means of a position/orientation module 231 as described above.

The AR viewer 200 may transmit the location and/or orientation of the AR viewer 200 to the host device 300 in a message 606 via the WLAN 150. The AR viewer 200 may also transmit the captured image of the EGM to the host device 300 in a message 612 via the WLAN 150. The host device 300 receives the information from the AR viewer 200 and, using the information provided by the AR viewer, identifies the EGM 100 in the image (block 614). In particular, the host device 300 may be configured with or otherwise obtain information about EGMs within the gaming environment, including both static information about the EGMs and dynamic information about the EGMs. Static information about the EGMs may include, for example, information about the EGMs that does not change over time or with game state, such as the location, orientation, cabinet type, hardware configuration, graphic design, etc. of the EGM. In some embodiments, the static information may include a visible code, such as a machine or inventory number, or a bar code or QR code, that uniquely identifies the EGM. Static information may further include information such as the size, location and color of the service window of the EGM. Static information may be stored in the EGM database 48, and may be accessible by the host device 300 through the network 50 (FIG. 1).

Dynamic information about the EGMs may include information about the EGM state that changes over time, such as a current screen, static image or animation displayed on the EGM, a state of a credit meter, win meter, or service window, a current sound being played by the EGM, the current position of elements on the screen, etc. Dynamic information may further include information such as a theme currently displayed on is a display screen of the EGM, a current value of a meter, such as a paid meter shown on the a display screen, a state of state of door icons of the EGM, a background color of the game, a state and information about an error or tilt message, a state of status icons on the EGM such as a door open icon, color and intensity of lighting currently displayed on the EGM, color or lighting on the bill validator, card reader or other device, and/or whether a player is currently playing at the EGM.

The host device 300 may collect dynamic information from EGMs in the gaming environment from time to time and/or may query an EGM 100 to obtain dynamic information about the EGM 100 on an as-needed basis. In some embodiments, the host device 300 may use the position and/or orientation of the AR viewer 200 to narrow down the number of possible EGMs that are potential candidates, and then use the static and/or dynamic information about the EGMs 100 in the narrowed list of candidates to identify the particular EGM 100 in the image provided by the AR viewer 200.

Figure 8A:
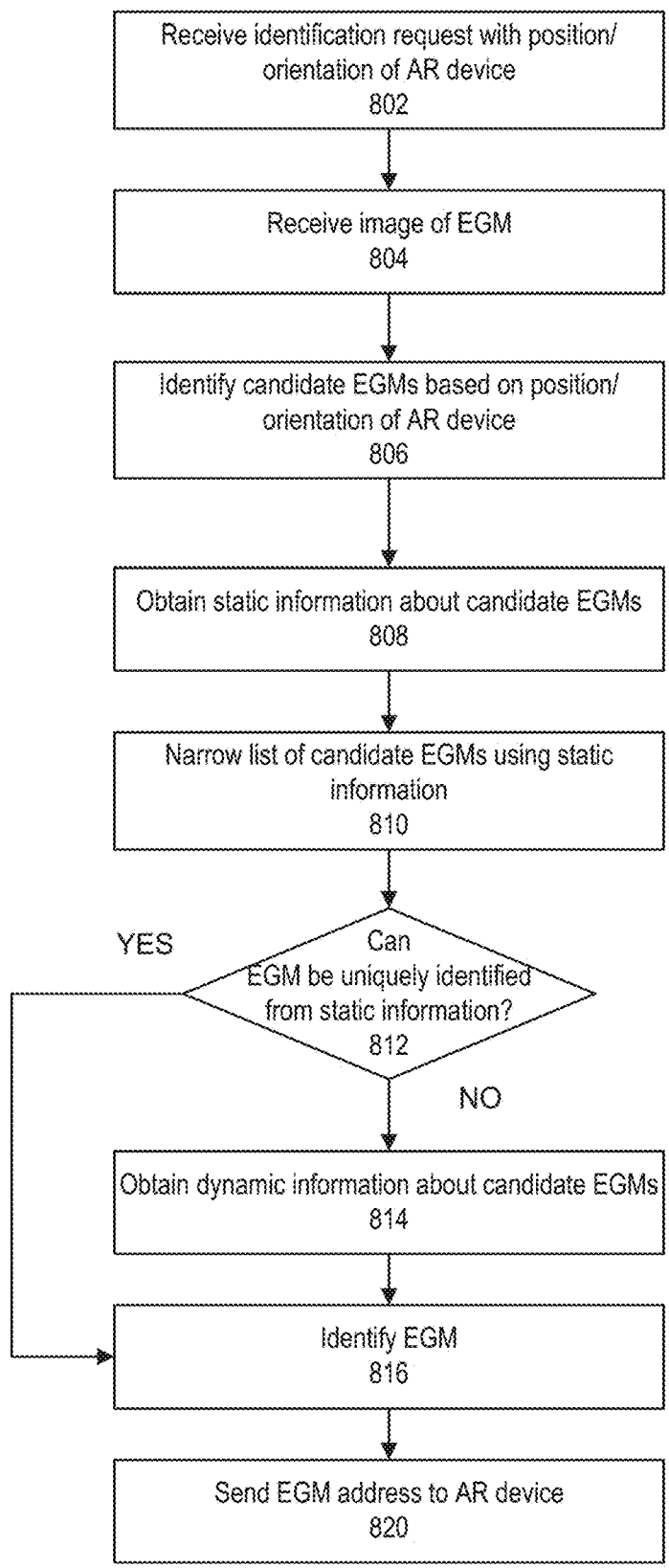
FIGS. 8A, 8B, 9, and 10 are flowcharts illustrating operations of systems/methods according to some embodiments.

Brief reference is made to FIG. 8A, which is a flowchart of operations that may be performed by a host device 300. Referring to FIG. 8A, the host device receives an identification request from an AR viewer 200 requesting the host device 300 to identify an EGM on behalf of the requesting AR device. The request may include position/orientation information of the AR viewer 200 (block 802). The host device 300 also receives an image of an EGM 100 that the requesting AR viewer 200 would like for the host device 300 to identify (block 804). At block 806, the host device 300 identifies one or more candidate EGMs based on the position/orientation information provided by the AR device.

The host device 300 may then obtain static information known about the candidate EGMs 100, such as from a local database (block 808). The host device 300 compares the image of the EGM 100 to the static information about the candidate EGMs 100 to first narrow the list of candidate EGMs using the static information (block 810) and then determine whether the EGM 100 in the image can be uniquely identified based on the static information (block 812). For example, in one embodiment, the static information about the candidate EGMs may include information about the display configuration of the EGMs. The host device 300 may identify, based on the position/orientation of the AR viewer 200, four candidate EGMs, of which only one candidate EGM has a dual screen display. The host device may determine from the image provided by the AR viewer 200 that the EGM in the image has a dual screen display. In that case, the host device 300 may then make a hypothesis about the identity of the EGM based on the comparison of the image with the static information, namely, that the EGM in the image is the candidate EGM having a dual screen display. In another embodiment, the host device 300 may narrow the list of candidate EGMs to include only those EGMs having a dual screen display based on the image provided by the AR viewer 200.

It will be appreciated that in some embodiments, the AR device may not provide position/orientation data, and that the list of candidate EGMs may be all EGMs in the gaming facility. Moreover, as discussed below, in some embodiments it will be desirable for the AR viewer 200 to confirm the identity of the EGM to ensure that the hypothesis by the host device 300 is correct.

If the host device 300 determines at block 812 that the EGM can be uniquely identified (with an acceptable level of confidence) based on the static information, operations proceed to block 816, where the host device 300 identifies the EGM 100, for example, by determining a network address or address/port combination of the identified EGM, and then sends the address or address/port information to the AR device (block 820).

If the host device 300 determines at block 812 that the EGM cannot be uniquely identified based on the static information (such as, for example, if the AR viewer 200 is oriented towards a bank of identical EGMs), the host device 300 may obtain dynamic information about current states of the candidate EGMs (block 814). Dynamic information can be obtained directly from the EGMs, such as by querying the EGMs via a network connection. The host device 300 may then determine the identity of the EGM in the image based on both the static and dynamic information about the candidate EGMs at block 816. Once the host device 300 has determined the identity of the EGM in the image provided by the AR viewer 200, the host device sends the network address of the EGM to the AR viewer 200 at block 820.

Returning to FIG. 6A, the host device 300 may transmit the network address of the identified EGM to the AR device in a message 616 via the WLAN 150. The AR viewer 200 may then send a message 620 to the EGM 100 using the address provided by the host device 300 requesting confirmation of the identity of the EGM 100. In response, the EGM 100 may display a confirmation graphic (block 630). The EGM 100 may simultaneously transmit the confirmation graphic to the AR viewer 200 via the WLAN 150. If the AR viewer 200 determines that the confirmation graphic provided by the EGM 100 via the WLAN 150 is actually being displayed by the desired EGM (i.e., the EGM captured in the image at block 604), the AR viewer 200 and the EGM 100 can confirm the pairing of the devices via a message exchange 634.

Figure 6B:
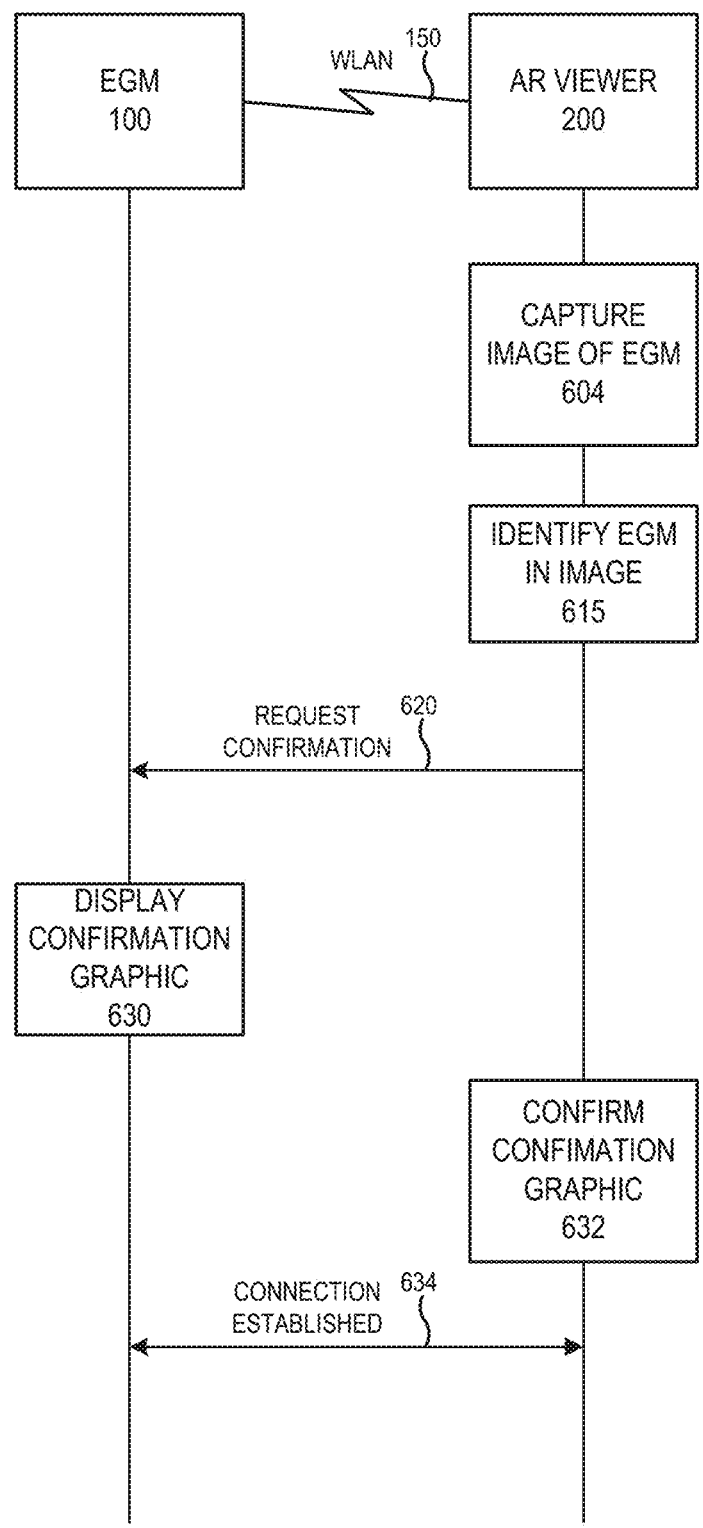

FIG. 6B illustrates embodiments in which pairing via WLAN is performed without the assistance of a separate host device. Referring to FIG. 6B, both an AR viewer 200 and an EGM 100 may be connected to a WLAN 150.

When a player indicates interest to the AR viewer 200 in connecting to an EGM 100, for example, with a spoken command to the AR viewer 200 (e.g., "connect me to that game") via the microphone 229, the AR viewer 200 may attempt to identify the EGM 100 indicated by the player. In particular, the AR viewer 200 may capture an image of the EGM 100 via the camera 230 (block 604). The image may be a still image or a video. Audio from the EGM 100 may also be captured. The AR viewer 200 may also obtain position and orientation information of the AR viewer 200 at the time the image was captured, such as by means of a position/orientation module 231 as described above.

The AR viewer 200 may then attempt to identify the EGM 100 from the image. In particular, the AR viewer may attempt to determine a network address of the EGM 100 on the WLAN 150 so that it can communicate with the EGM 100. In this regard, the AR viewer 200 may have EGM information, such as static information, about EGMs in the gaming environment stored locally in the AR viewer 200, or may obtain information about EGMs in the environment from the EGM database 48. As noted above, static information about the EGMs may include, for example, information about the EGMs that does not change over time or with game state, such as the location, orientation, cabinet type, hardware configuration, graphic design, etc. of the EGM. In some embodiments, the static information may include a visible code, such as a machine or inventory number, an asset number, or a bar code or QR code, that uniquely identifies the EGM. Static information may further include information such as the size, location and color of the service window of the EGM.

In some embodiments, the AR viewer 200 may obtain dynamic information about EGMs in the environment, for example, from the AR controller 70, which may collect dynamic information from EGMs in the gaming environment from time to time and/or may query an EGM 100 to obtain dynamic information about the EGM 100 on an as-needed basis. In some embodiments, the AR viewer 200 may use the position and/or orientation of the AR viewer 200 to narrow down the number of possible EGMs that are potential candidates, and then use the static and/or dynamic information about the EGMs 100 in the narrowed list of candidates to identify the particular EGM 100 that the user wishes to connect to.

Figure 8B:
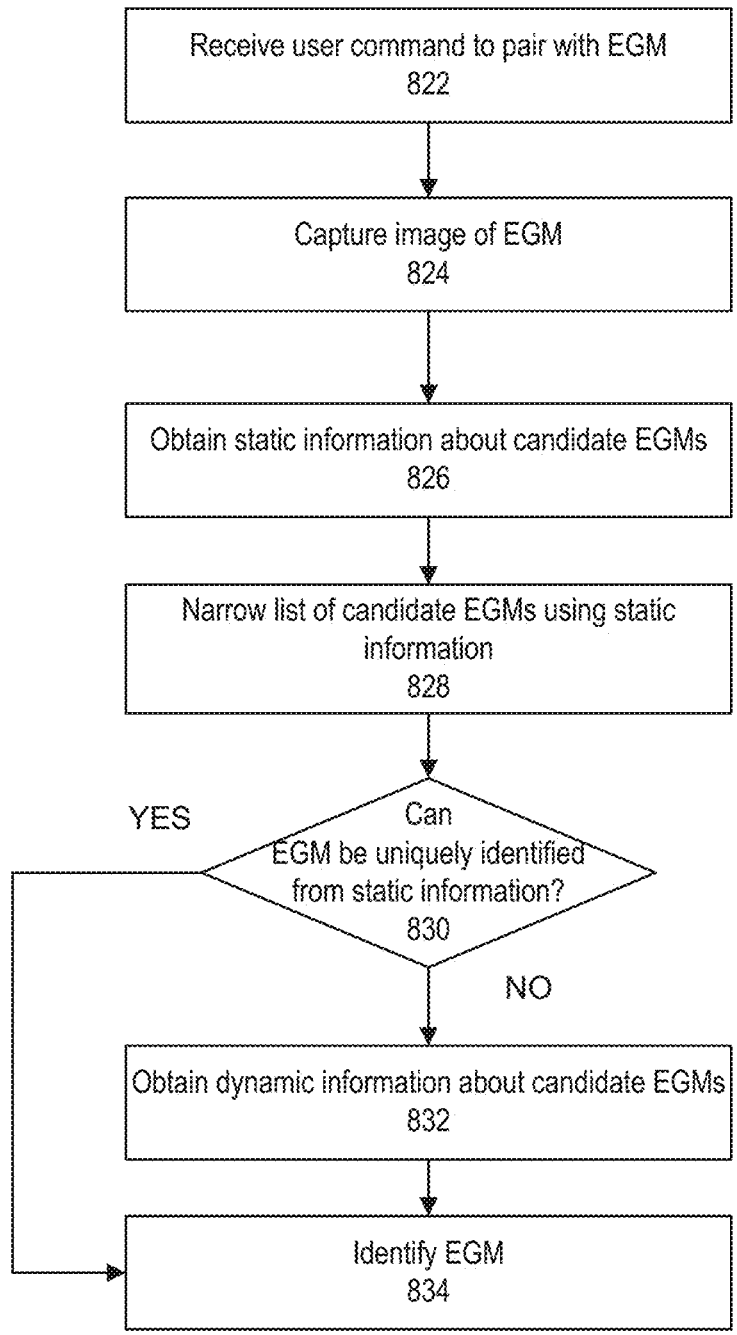

Brief reference is made to FIG. 8B, which is a flowchart of operations that may be performed by an AR viewer 200 to identify an EGM 100. Referring to FIG. 8B, the AR viewer 200 may receive a user command requesting the AR viewer 200 to pair with an EGM (block 822). In response, the AR viewer 200 may obtain image of an EGM 100 that the user would like to pair with (block 824). At block 826, the AR viewer 200 obtains static information known about the candidate EGMs 100, such as from a local database or from the EGM database 48 (block 826). The AR viewer 200 then compares the image of the EGM 100 to the static information about the candidate EGMs 100 to first narrow the list of candidate EGMs using the static information (block 828) and then determines whether the EGM 100 in the image can be uniquely identified based on the static information (block 830). If the AR viewer 200 determines at block 830 that the EGM can be uniquely identified (with an acceptable level of confidence) based on the static information, operations proceed to block 834, where AR viewer 200 identifies the EGM 100, for example, by determining a network address or address/port combination of the identified EGM.

If the AR viewer 200 determines at block 830 that the EGM cannot be uniquely identified based on the static information (such as, for example, if the AR viewer 200 is oriented towards a bank of identical EGMs), the AR viewer 200 may obtain dynamic information about current states of the candidate EGMs (block 832). Dynamic information can be obtained, for example, from the AR controller 70, from the EGM database 48, or from some other source. The AR viewer 200 may then determine the identity of the EGM in the image based on both the static and dynamic information about the candidate EGMs at block 834. Once the AR viewer 200 has determined the identity of the EGM in question, the host device can determine the network address of the EGM.

Returning to FIG. 6B, the AR viewer 200 may then send a message 620 to the EGM 100 using the address provided by the host device 300 requesting confirmation of the identity of the EGM 100. In response, the EGM 100 may display a confirmation graphic (block 630). The EGM 100 may simultaneously transmit the confirmation graphic to the AR viewer 200 via the WLAN 150. If the AR viewer 200 determines that the confirmation graphic provided by the EGM 100 via the WLAN 150 is actually being displayed by the desired EGM (i.e., the EGM captured in the image at block 604), the AR viewer 200 and the EGM 100 can confirm the pairing of the devices via a message exchange 634.

Figure 6C:
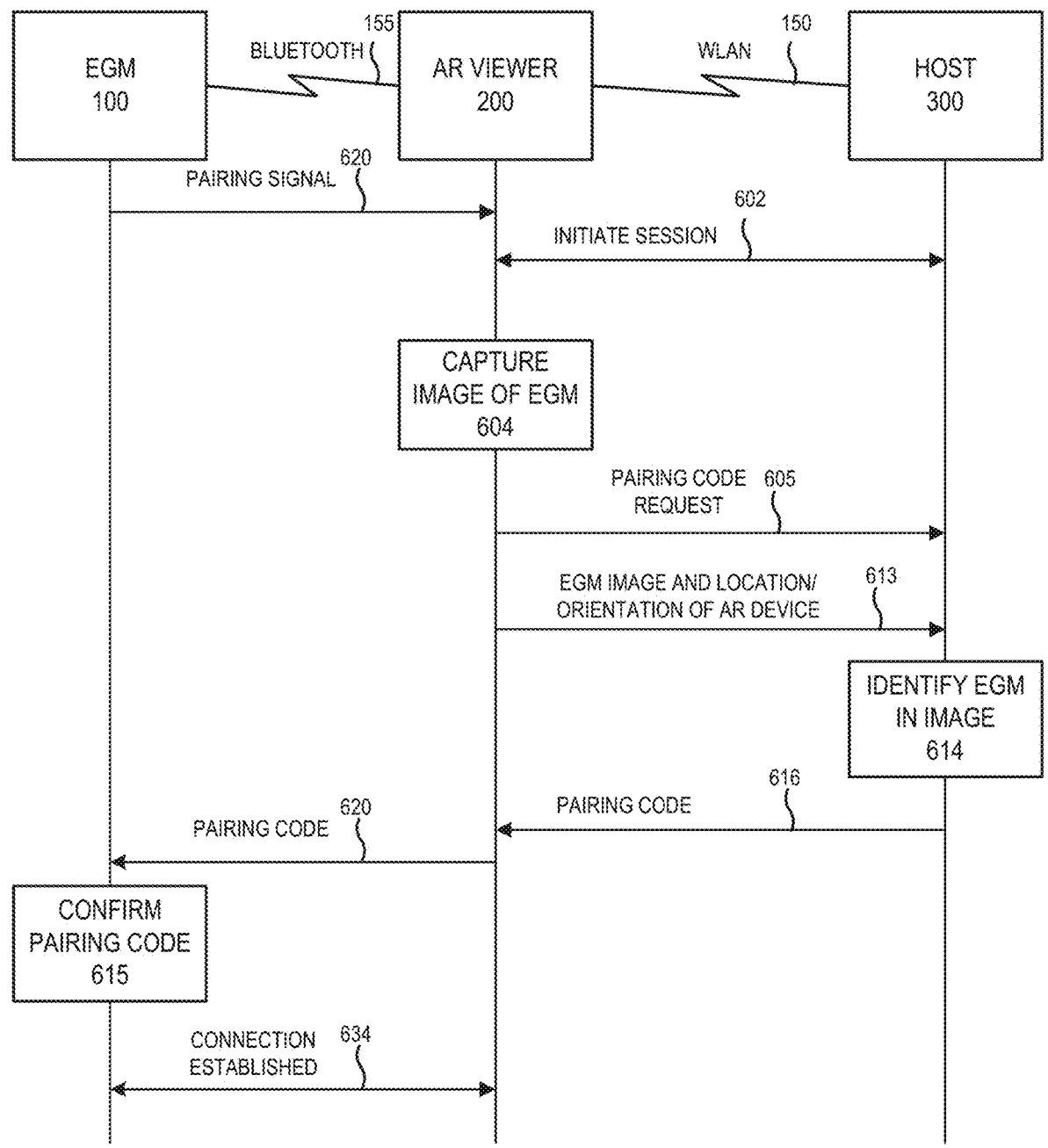

FIG. 6C is a flow diagram that illustrates embodiments in which a remote host server 300 assists in the pairing of an EGM 100 with an AR viewer 200 via Bluetooth with assistance from a host device 300. In the embodiments illustrated in FIG. 6C, the AR viewer 200 may communicate with a remote host 300 via a wireless local area network (WLAN) 150, while the connection between the AR viewer 200 and the EGM 100 may be established using a different network interface, such as a Bluetooth interface 155. The WLAN 150 may include one or more base stations, routers, access points, or other infrastructure (not shown). As is well known in the art, in some cases, a Bluetooth connection may be established when two devices share a common pairing code. Security of the connection may be enhanced when both devices know a secret pairing code. In the embodiments of FIG. 6C, an EGM 100 may be configured to broadcast a pairing signal 620 which may be received by an AR viewer 200. To respond to the pairing signal 620, the AR viewer 200 must provide a correct pairing code.

According to some embodiments, an AR viewer 200 may initiate a data communication session 602 with a host device 300 (which may be the AR controller 70 or another host system operated by the game provider) whose IP address is configured in the AR viewer 200 via the WLAN 150. When a player wishes to interact with a particular EGM 100, the player may indicate his or her interest, for example, by looking at the EGM 100 and speaking a command to the AR viewer 200 via the microphone 229. The AR viewer 200 may visually confirm which EGM 100 the player is referring to, and following such confirmation, may capture an image of the EGM 100 via the camera 230. The AR viewer 200 may also obtain position and orientation information of the AR viewer 200 at the time the image was captured, such as by means of a position/orientation module 231 as described above.

The AR viewer 200 may transmit a request 605 to the host device 300 to obtain a pairing code for an EGM. The AR viewer 200 also, in the pairing request 605 or in a separate message 613, transmit the image of the EGM 100 whose pairing code is requested along with the location and/or orientation of the AR viewer 200 to the host device 300 via the WLAN 150. The host device 300 receives the information from the AR viewer 200 and, using the information provided by the AR viewer, identifies the EGM 100 in the image (block 614), such as via the operations described above with respect to FIG. 8A.

Once the host device has identified the EGM 100, the host device 300 may transmit a Bluetooth pairing code of the identified EGM to the AR device in a message 616 via the WLAN 150. The AR viewer 200 may then send the pairing code to the EGM 100 in a Bluetooth pairing message 620. The EGM 100 confirms the pairing code (block 615), and, if the pairing code is confirmed, establishes a Bluetooth data connection 634 with the AR viewer 200.

Figure 6D:
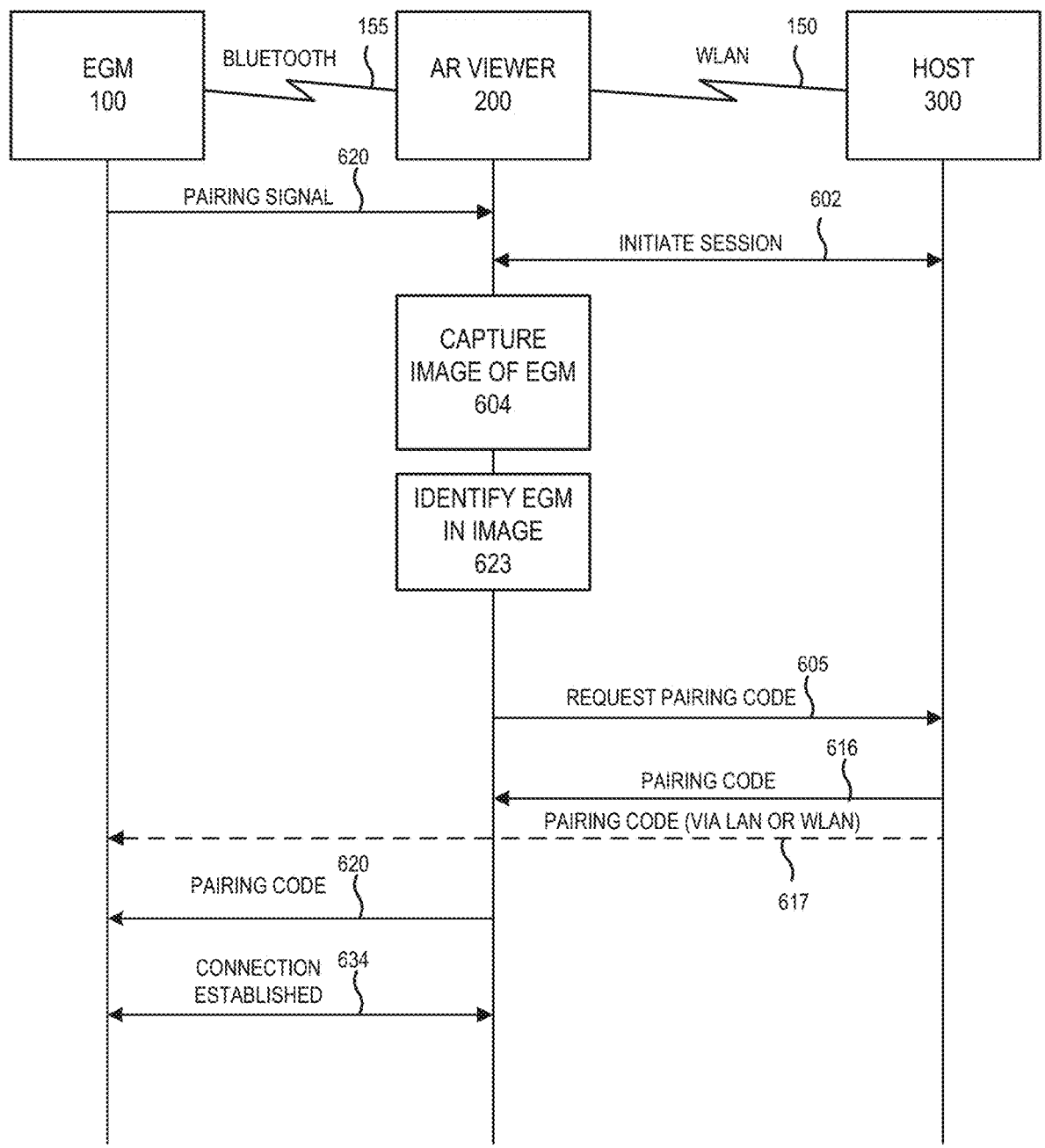

FIG. 6D is a flow diagram that illustrates embodiments in which a remote host server 300 assists in the pairing of an EGM 100 with an AR viewer 200 via Bluetooth with assistance from a host device 300 according to further embodiments. In the embodiments illustrated in FIG. 6D, the AR viewer 200 may communicate with a remote host 300 via a wireless local area network (WLAN) 150, while the connection between the AR viewer 200 and the EGM 100 may be established using a different network interface, such as a Bluetooth interface 155. In the embodiments of FIG. 6D, an EGM 100 may be configured to broadcast a pairing signal 620 which may be received by an AR viewer 200. To respond to the pairing signal 620, the AR viewer 200 must provide a correct pairing code.

After initiating a data communication session 602 with a host device 300 (which may be the AR controller 70 or another host system operated by the game provider) whose IP address is configured in the AR viewer 200 via the WLAN 150, when a player wishes to interact with a particular EGM 100, the AR viewer 200 may capture an image of the EGM 100 via the camera 230. The AR viewer 200 may also obtain position and orientation information of the AR viewer 200 at the time the image was captured, such as by means of a position/orientation module 231 as described above.

The AR viewer 200 may then identify the EGM 100 in the image, either by itself or with the help of the host device 300 (block 623). Once the AR viewer 200 has identified the EGM 100, the AR viewer 200 may transmit a request 605 to the host device 300 to obtain a pairing code for the EGM 100. The pairing request 607 may identify the EGM 100 with which the AR viewer 200 wishes to pair.

In response, host device 300 may transmit a Bluetooth pairing code to the AR viewer 200 in a message 616 via the WLAN 150 and also transmit the Bluetooth pairing code to the identified EGM 100 via the WLAN 150 or the network 50 (FIG. 1) via a message 617. The AR viewer 200 may then send the pairing code to the EGM 100 in a Bluetooth pairing message 620. The EGM 100, which has received the pairing code from the host device 300, confirms the pairing code (block 615), and, if the pairing code is confirmed, establishes a Bluetooth data connection 634 with the AR viewer 200.

Figure 6E:
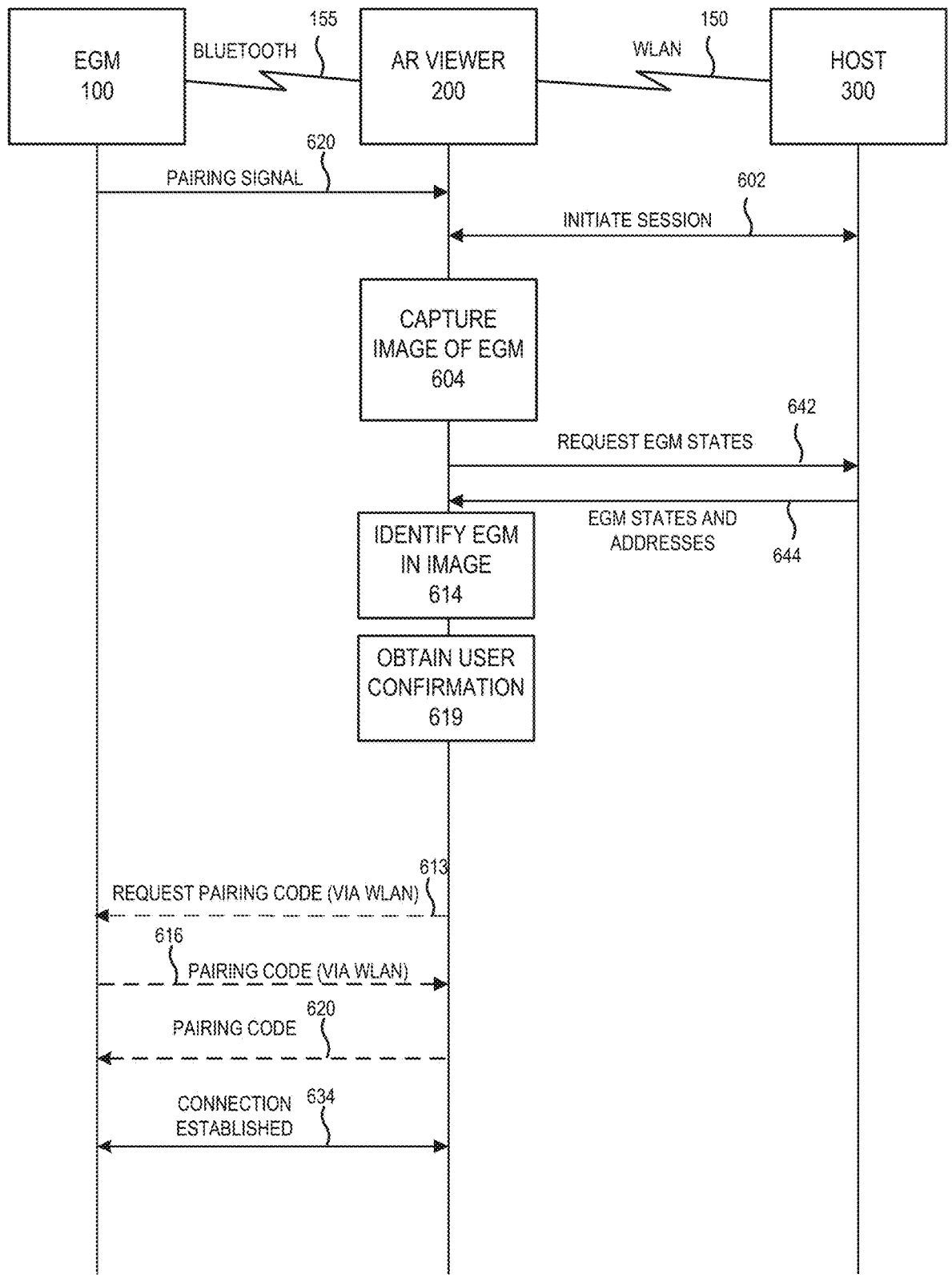

FIG. 6E is a flow diagram that illustrates embodiments in which a remote host server 300 assists in the pairing of an EGM 100 with an AR viewer 200 via Bluetooth with assistance from a host device 300 according to still further embodiments. In the embodiments illustrated in FIG. 6E, the AR viewer 200 may communicate with a remote host 300 via a wireless local area network (WLAN) 150, while the connection between the AR viewer 200 and the EGM 100 may be established using a different network interface, such as a Bluetooth interface 155. In the embodiments of FIG. 6E, an EGM 100 may be configured to broadcast a pairing signal 620 which may be received by an AR viewer 200. To respond to the pairing signal 620, the AR viewer 200 must provide a correct pairing code.

After initiating a data communication session 602 with a host device 300 (which may be the AR controller 70 or another host system operated by the game provider) whose IP address is configured in the AR viewer 200 via the WLAN 150, when a player wishes to interact with a particular EGM 100, the AR viewer 200 may capture an image of the EGM 100 via the camera 230 (block 604). The AR viewer 200 may also obtain position and orientation information of the AR viewer 200 at the time the image was captured, such as by means of a position/orientation module 231 as described above.

To assist with identifying the EGM 100, the AR viewer 200 may request information about states of EGMs within a gaming area or within a predetermined range around a location of the AR viewer 200 in a message 642. The host device 300 responds in a message 644 with the requested state information. The AR viewer 200 may then identify the EGM 100 in the image in accordance with the operations illustrated in FIG. 8B. Once the EGM 100 has been identified, the AR viewer 200 may know a network address for the EGM 100 on the WLAN 150.

Once the AR viewer 200 has identified the EGM 100, the AR viewer 200 may transmit a request 613 to the EGM 100 to obtain a pairing code for the EGM 100, which the EGM 100 may provide in a message 616 via the WLAN 150. The AR viewer 200 may then send the pairing code to the EGM 100 in a Bluetooth pairing message 620. The EGM 100, which has received the pairing code from the host device 300, confirms the pairing code (block 615), and, if the pairing code is confirmed, establishes a Bluetooth data connection 634 with the AR viewer 200.

Game state information provided by the host device 300 may include dynamic game information as described above. For example, game state information about the EGMs may include information about the EGM state, such as a current screen, static image or animation displayed on the EGM, a state of a credit meter, win meter, or service window, etc. Dynamic information may further include information such as a theme currently displayed on is a display screen of the EGM, a current value of a meter, such as a paid meter shown on the a display screen, a state of state of door icons of the EGM, a background color of the game, a state and information about an error or tilt message, a state of status icons on the EGM such as a door open icon, color and intensity of lighting currently displayed on the EGM, color or lighting on the bill validator, card reader or other device, and/or whether a player is currently playing at the EGM.

The game state information may be used by the AR viewer 200 to narrow down a list of possible EGMs and/or to uniquely identify an EGM out of a list of possible EGMs.

Figure 6F:
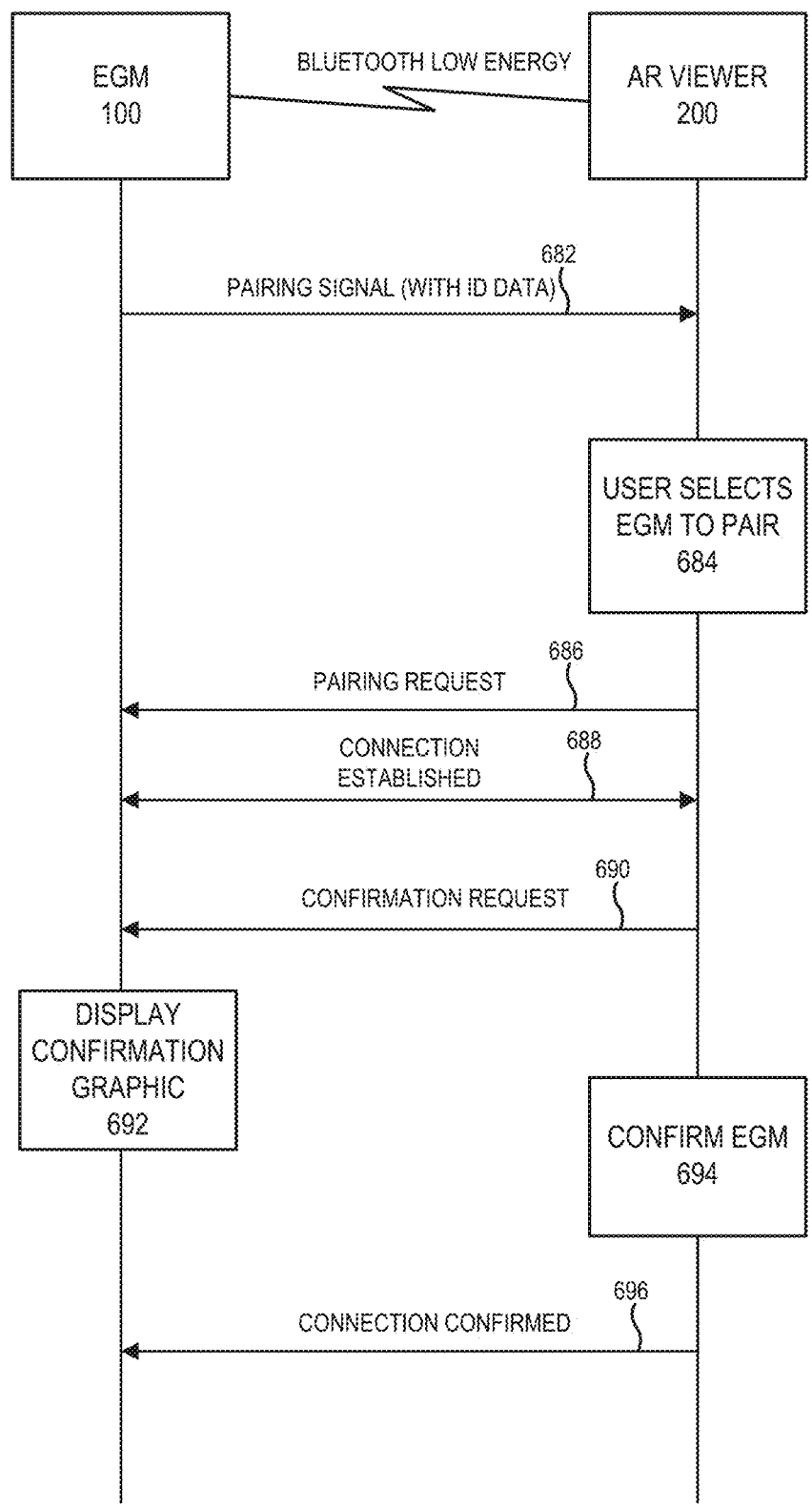

Some embodiments may employ a Bluetooth Low Energy (BTLE) protocol, which does not require a pairing code. For example, referring to FIG. 6F, an AR viewer 200 may receive Bluetooth low energy pairing signals 682 from a plurality of EGMs 100. The BTLE pairing codes may carry identifying information about the EGMs, such as asset number, current state information, or other information. The user of the AR viewer 200 may select an EGM 100 with which to pair, and the AR viewer 200 may use the identification data provided in the BTLE pairing signals to attempt to determine which EGM 100 has been selected. Once an EGM 100 has been selected by the AR viewer 200, the AR viewer 200 may send a pairing request 686 to the EGM 100, at which point a BTLE connection 688 is established. To confirm that the AR viewer 200 has paired with the correct EGM, the AR viewer 200 may send a confirmation request 690 to the EGM 100 via the BTLE connection. In response, the EGM 100 may display a confirmation graphic (block 692), which is confirmed by the AR viewer 200 at block 694, at which point the BTLE connection is confirmed, and the user can commence to operate the EGM 100 using the AR viewer 200.

Figure 7:
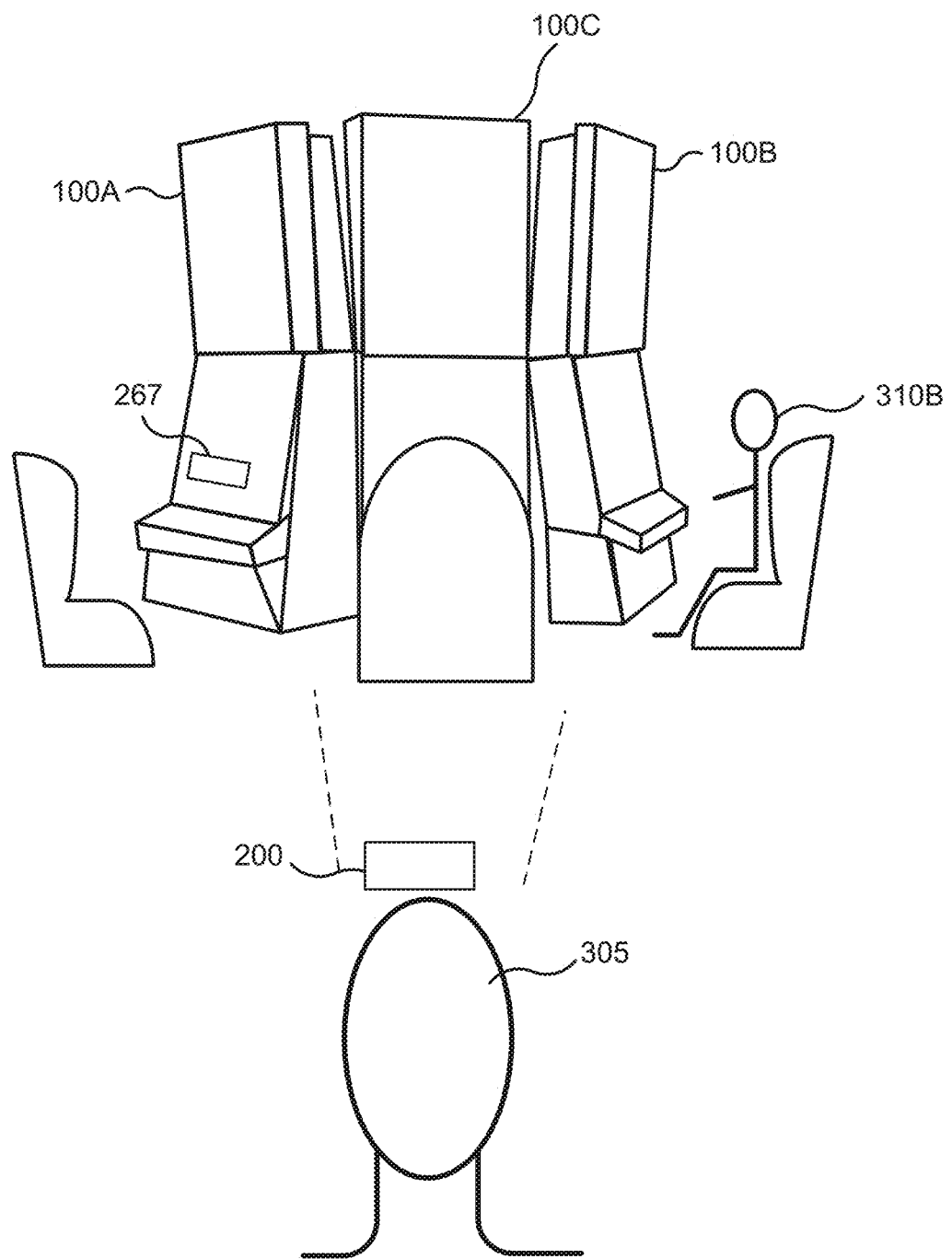
FIG. 7 is a perspective view illustrating users viewing a group of electronic gaming machines using augmented reality viewers according to some embodiments.

The confirmation graphic could take the form of any of a number of visible state changes by the EGM 100. For example, displaying the confirmation graphic may include changing the one or more of EGM cabinet lights, EGM game screen(s), pixels (color and/or intensity). Displaying the confirmation graphic may include flashing a pattern, displaying a text message or a QR code on the screen, displaying a game theme icon, etc. In some embodiments, displaying the confirmation graphic may include changing the timing of graphical elements on the screen, such as slowing down or speeding up an animation on the screen, spinning virtual reels or slip cards, changing the game theme (e.g., switching from poker to slot games), displaying a main menu or a particular set of game icons in the main menu, and/or change the visual state of a top box, bill validator or ticket printer For example, referring to FIG. 7, a user 305 using an AR viewer 200 may wish to pair with an EGM 100C in a bank of EGMS 100A, 100B, 100C. The EGMs 100A, 100B, 100C may each broadcast a BTLE pairing signal, and the AR viewer 200 may be close enough to the bank of machines to receive all three pairing signals. The pairing signals may indicate certain identification information about the EGMs that may help the AR device uniquely identify a desired machine. For example, the information may indicate whether the EGM is currently in use by another player 310B, whether a service window 267 is open, etc. In the example shown in FIG. 7, a player may direct the AR device to pair with EGM 100C. The AR viewer 200 may receive a pairing signal from all three EGMs 100A, 100B, 100C. The pairing signal from EGM 100A may indicate that a service window 267 is open on the machine, while the pairing signal from EGM 100B may indicate that it is currently in use by a player. From this information, the AR device may decide to pair with EGM 100B, whose state appears to correspond with the state of the machine selected by the user. Once paired, the AR viewer 200 can request the EGM 100C to display a confirmation graphic confirming that the AR device has paired with the correct EGM.

Figure 9:
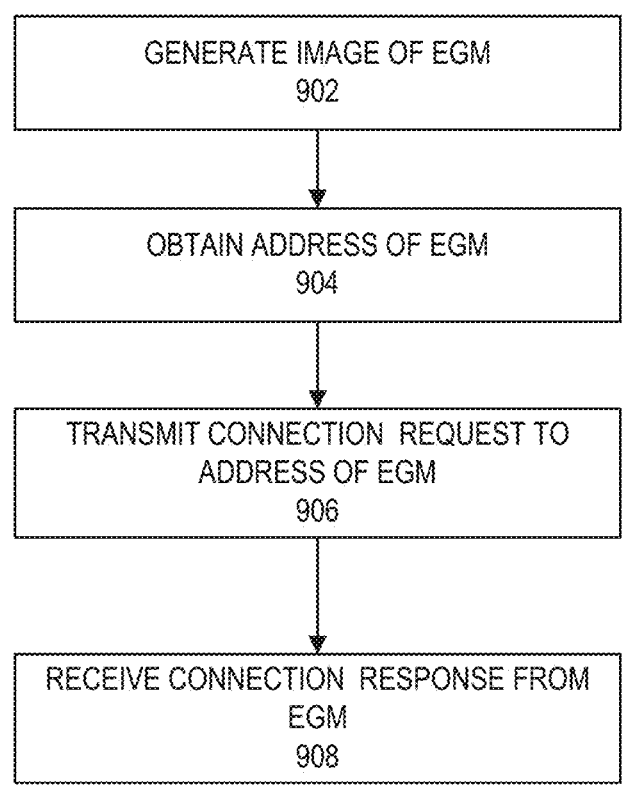

Operations according to some embodiments are illustrated in the flowchart of FIG. 9. As shown therein, operations that may be performed by an AR viewer 200 according to some embodiments include generating an image of an EGM 100 with which a user of the AR device would like to pair the AR device (block 902). The AR device then obtains a network address of the EGM (block 904), such as an IP address or Bluetooth address associated with the EGM pictured in the image. The AR viewer 200 then transmits a connection request to the address of the EGM (block 906) and receives a registration response from the EGM (block 908) indicating that a connection has been established. The connection request may, for example be a pairing request sent via Bluetooth, or a session initiation request sent via a local area network. The AR viewer 200 may then confirm that the correct EGM has been paired as described above.

Figure 10:
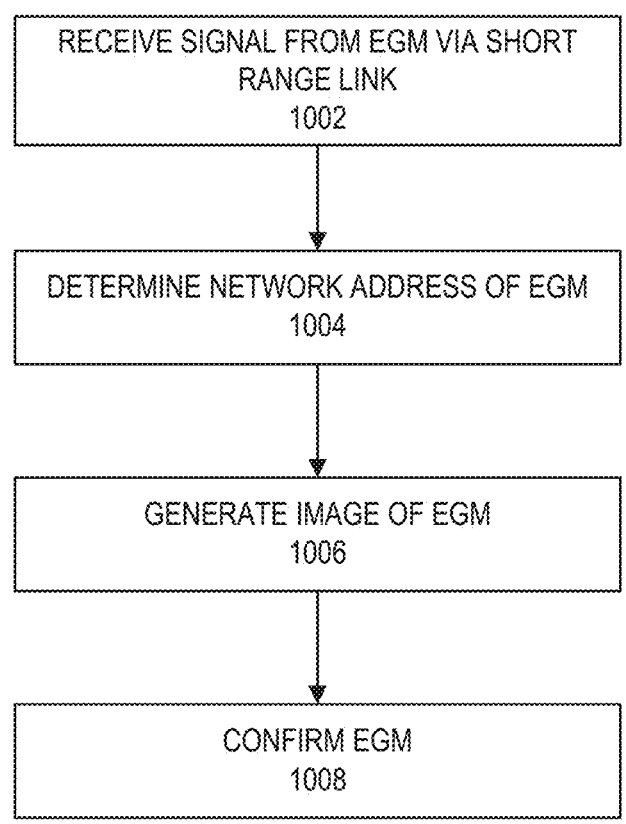

Further operations of an AR device to pair with an EGM are illustrated in FIG. 10. As shown therein, according to some embodiments, an AR device may receive a signal from an EGM over a short range communication link, such as a Bluetooth interface or NFC interface (block 1002). The signal may, for example, be a Bluetooth pairing signal transmitted by the EGM. The AR device determines an address of the EGM, such as a Bluetooth address, based on the signal (1004) and generates an image of the EGM (block 1006). The AR device uses the image of the EGM to confirm the identity of the EGM with which it is paired (block 1008).

Electronic Gaming Machines

Figure 11A:
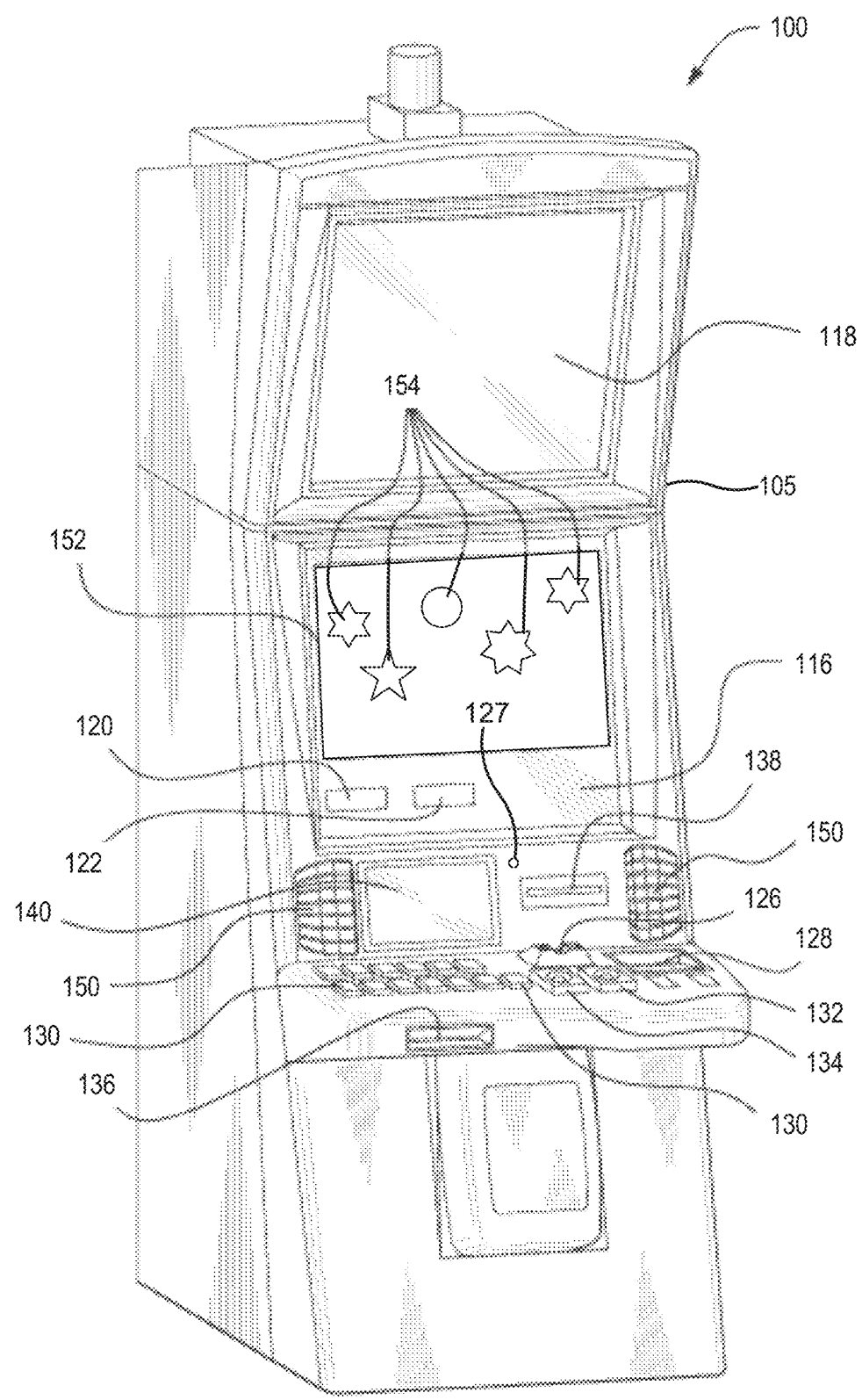
FIG. 11A is a perspective view of an electronic gaming device that can be configured according to some embodiments.
Figure 11B:
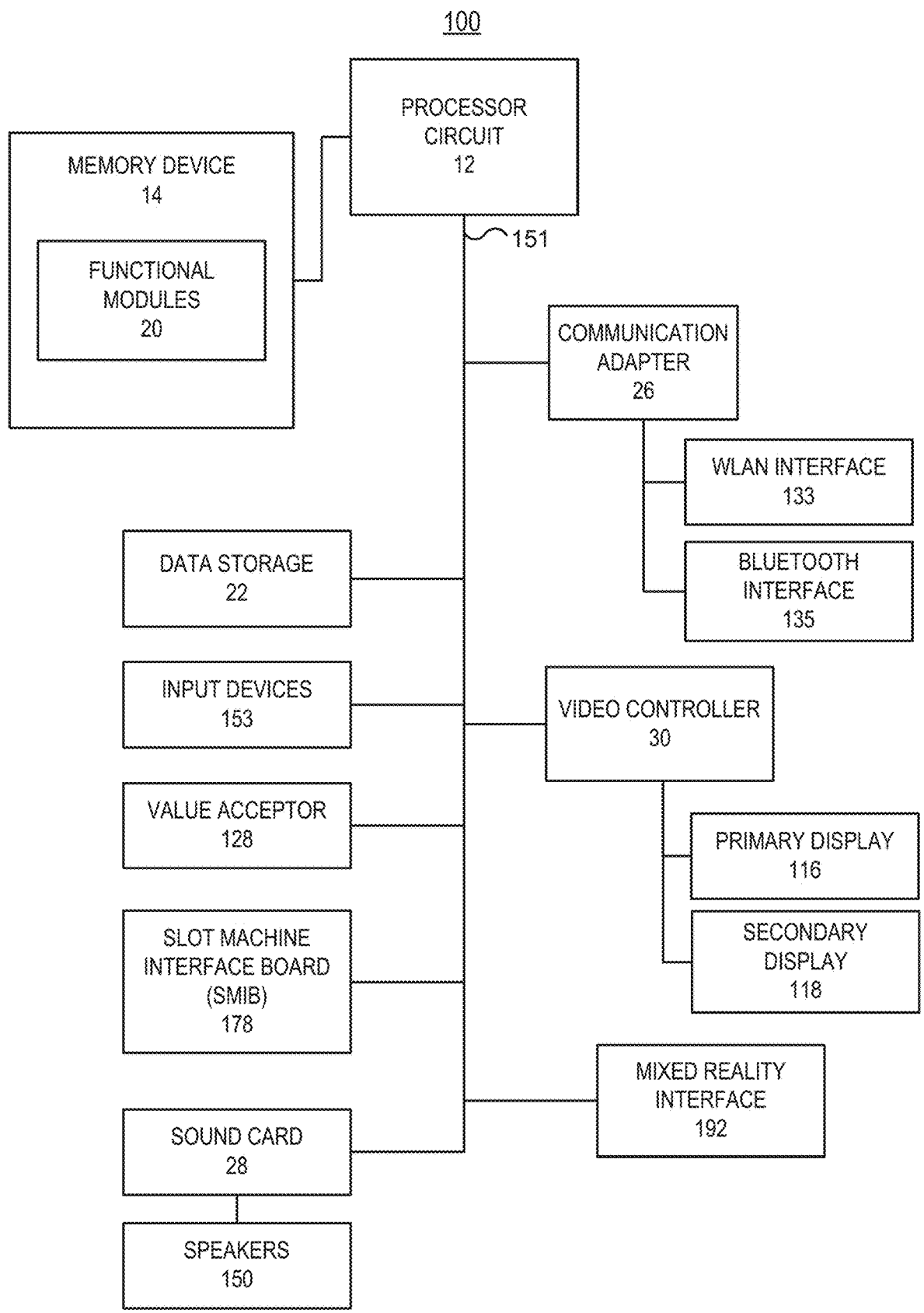
FIG. 11B is a schematic block diagram illustrating an electronic configuration for a gaming device according to some embodiments.
Figure 11C:
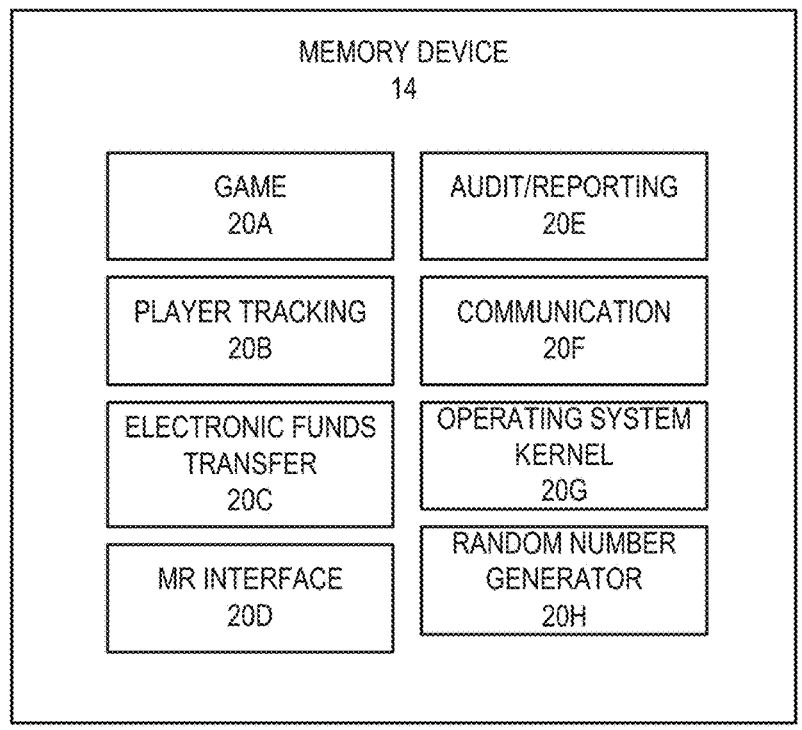
FIG. 11C is a block diagram that illustrates various functional modules of an electronic gaming device according to some embodiments.

An example of an electronic gaming machine (EGM) that can interact with mixed reality viewers according to various embodiments is illustrated in FIGS. 11A, 11B, and 11C in which FIG. 11A is a perspective view of an EGM 100 illustrating various physical features of the device, FIG. 11B is a functional block diagram that schematically illustrates an electronic relationship of various elements of the EGM 100, and FIG. 11C illustrates various functional modules that can be stored in a memory device of the EGM 100. The embodiments shown in FIGS. 11A to 11C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 11A and 11B. For example, referring to FIG. 11A, an EGM 100 may include a support structure, housing or cabinet 105 which provides support for a plurality of displays, inputs, outputs, controls and other features that enable a player to interact with the EGM 100.

The EGM 100 illustrated in FIG. 11A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 11A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 11A and 11B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 11B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 11B, operation of the primary display device 116, the secondary display device 118 and the player tracking display 140 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30.

Referring again to FIG. 11A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 11A, the EGM 100 may also include a note dispenser configured to dispense paper currency and/or a coin generator configured to dispense coins or tokens in a coin payout tray.

The EGM 100 may further include one or more speakers 150 controlled by one or more sound cards 28 (FIG. 11B). The EGM 100 illustrated in FIG. 11A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 11B is a block diagram that illustrates logical and functional relationships between various components of an EGM 100. As shown in FIG. 11B, the EGM 100 may include a processor circuit 12 that controls operations of the EGM 100. Although illustrated as a single processor circuit, multiple special purpose and/or general purpose processor circuits and/or processor circuit cores may be provided in the EGM 100. For example, the EGM 100 may include one or more of a video processor, a signal processor, a sound processor and/or a communication controller that performs one or more control functions within the EGM 100. The processor circuit 12 may be variously referred to as a "controller," "microcontroller," "microprocessor" or simply a "computer." The processor circuit may further include one or more application-specific integrated circuits (ASICs).

Various components of the EGM 100 are illustrated in FIG. 11B as being connected to the processor circuit 12. It will be appreciated that the components may be connected to the processor circuit 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 11D.

The memory device 14 may store program code and instructions, executable by the processor circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 including transceiver circuitry that enables the EGM 100 to communicate with remote devices over a wired and/or wireless communication network, such as a local area network (LAN), wide area network (WAN), cellular communication network, or other data communication network. The communication adapter 26 may further include transceiver circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the EGM 100 may include a sensor, such as a camera in communication with the processor circuit 12 (and possibly controlled by the processor circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor circuit 12 may incorporate that image into the primary and/or secondary game as a game image, symbol or indicia.

Various functional modules of that may be stored in a memory device 14 of an EGM 100 are illustrated in FIG. 11C. Referring to FIG. 11C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The Augmented Reality interface module 20D interacts with an AR viewer 200 as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 11D:
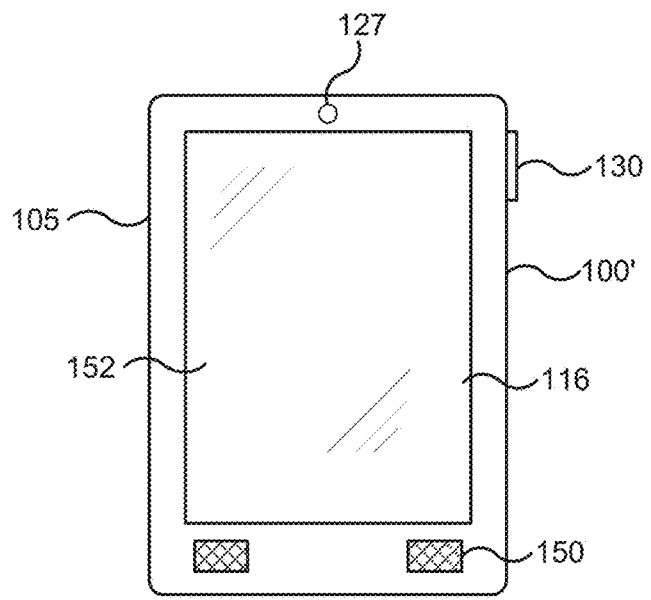
FIG. 11D is perspective view of a handheld electronic gaming device that can be configured according to some embodiments.

For example, referring to FIG. 11D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 11E:
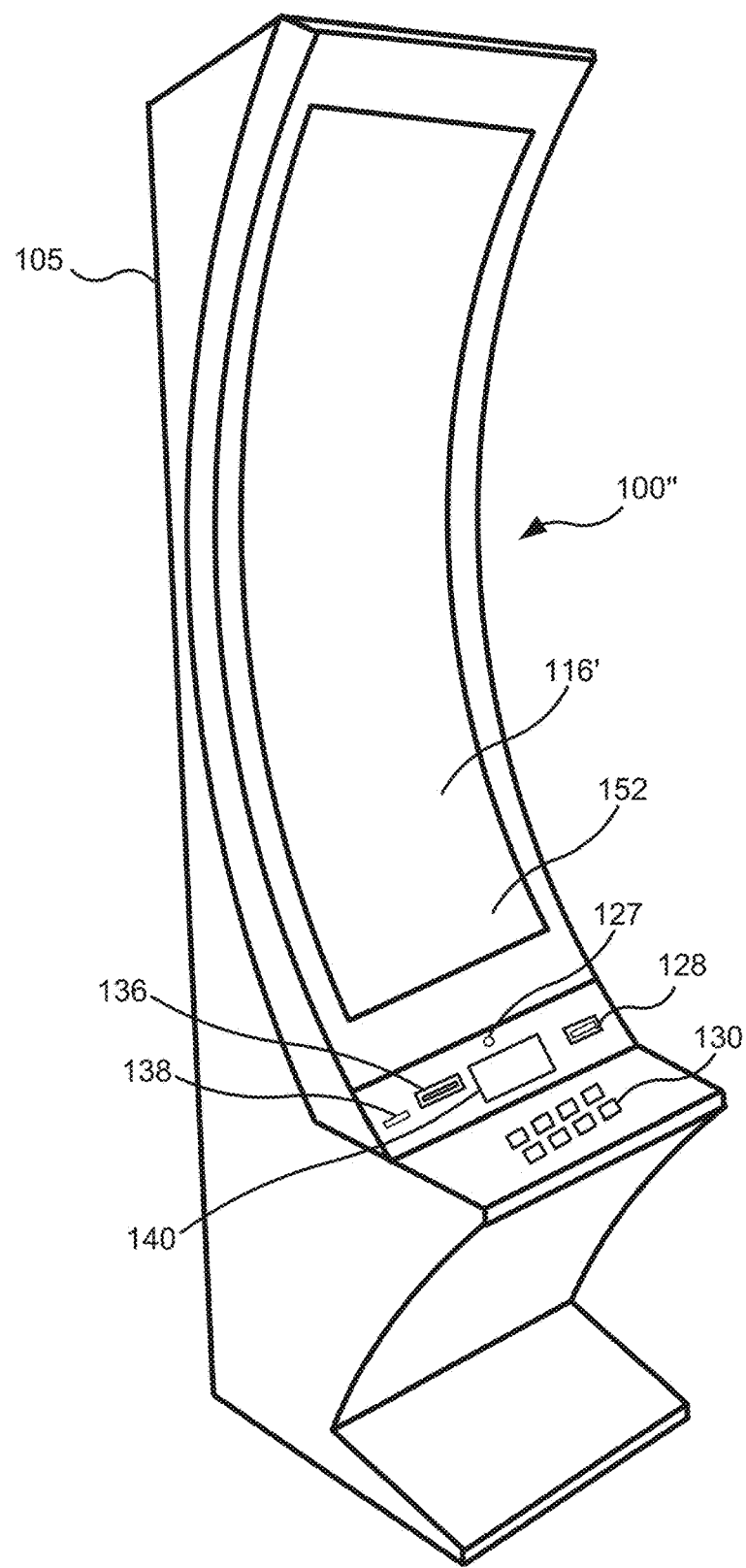
FIG. 11E is a perspective view of an electronic gaming device according to further embodiments.

FIG. 11E illustrates a standalone EGM 100" having a different form factor from the EGM 100 illustrated in FIG. 11A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Figure 12:
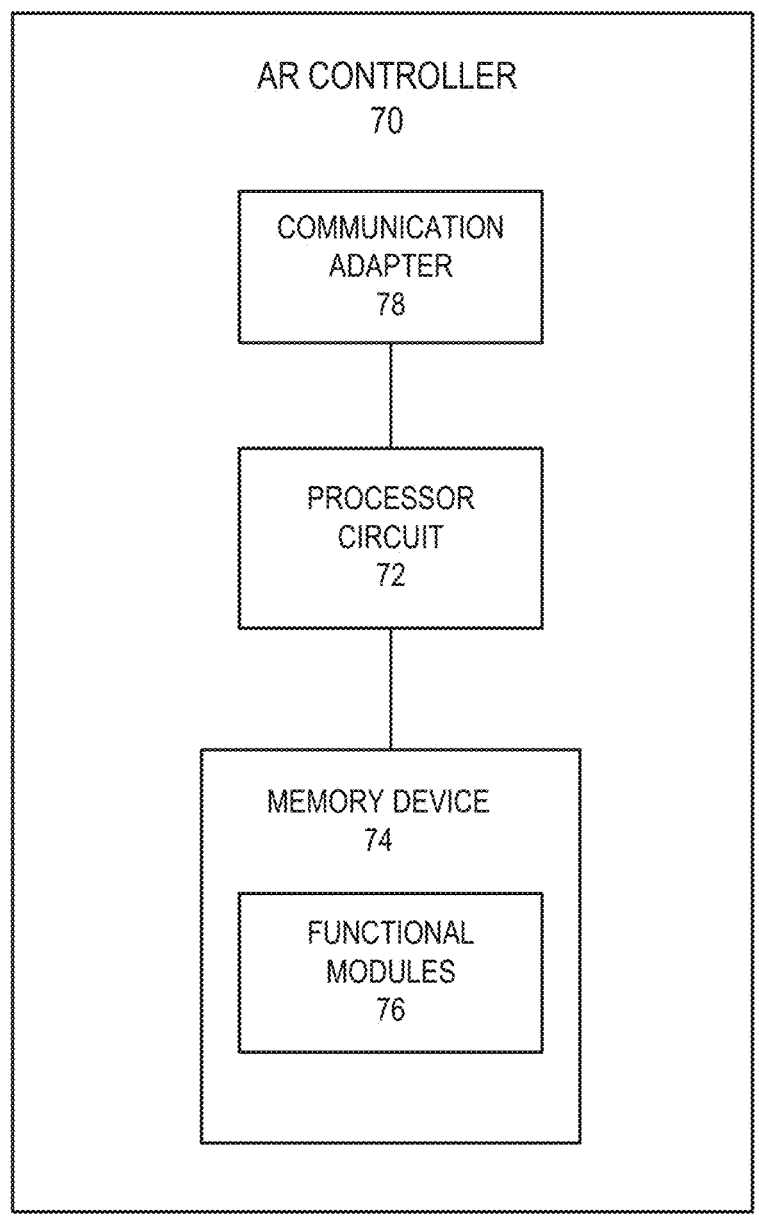
FIG. 12 is a schematic block diagram illustrating an electronic configuration for an augmented reality controller according to some embodiments.

FIG. 12 is a block diagram that illustrates various components of an AR controller 70 according to some embodiment. As shown in FIG. 12, the AR controller 70 may include a processor circuit 72 that controls operations of the AR controller 70. Although illustrated as a single processor circuit, multiple special purpose and/or general purpose processor circuits and/or processor circuit cores may be provided in the AR controller 70. For example, the AR controller 70 may include one or more of a video processor, a signal processor, a sound processor and/or a communication controller that performs one or more control functions within the AR controller 70. The processor circuit 72 may be variously referred to as a "controller," "microcontroller," "microprocessor" or simply a "computer." The processor circuit may further include one or more application-specific integrated circuits (ASICs).

Various components of the AR controller 70 are illustrated in FIG. 12 as being connected to the processor circuit 72. It will be appreciated that the components may be connected to the processor circuit 72 through a system bus, a communication bus and controller, such as a USB controller and USB bus, a network interface, or any other suitable type of connection.

The AR controller 70 further includes a memory device 74 that stores one or more functional modules 76 for performing the operations described above.

The memory device 74 may store program code and instructions, executable by the processor circuit 72, to control the AR controller 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The AR controller 70 may include a communication adapter 78 including transceiver circuitry that enables the AR controller 70 to communicate with remote devices, such as EGMs 100 and/or a player tracking server 45 (FIG. 1) over a wired and/or wireless communication network, such as a local area network (LAN), wide area network (WAN), cellular communication network, or other data communication network.

The EGM 100 may include one or more internal or external communication ports that enable the processor circuit 72 to communicate with and to operate with internal or external peripheral devices, such as display screens, keypads, mass storage devices, microphones, speakers, and wireless communication devices. In some embodiments, internal or external peripheral devices may communicate with the processor circuit through a universal serial bus (USB) hub (not shown) connected to the processor circuit 72.

Further Embodiments

An augmented reality (AR) viewing device according to some embodiments includes a processor circuit, a memory coupled to the processor circuit, a wireless transceiver coupled to the processor circuit, and a camera coupled to the processor circuit. The memory includes computer readable instructions that cause the processor circuit to generate an image of the EGM using the camera, obtain, based on the image of the EGM, a network address associated with the EGM, transmit a registration message using the wireless transceiver to the network address associated with the EGM, and receive a registration response using the wireless transceiver from the EGM in response to the registration message.

A method of pairing an augmented reality (AR) viewing device including a camera with an electronic gaming machine (EGM) includes generating an image of the EGM using the camera, obtaining, based on the image of the EGM, a network address associated with the EGM, transmitting a registration message to the network address associated with the EGM, and receiving a registration response from the EGM in response to the registration message.

The method may further include identifying, from the image, a visible feature associated with the EGM, wherein the network address is obtained based on the visible feature associated with the EGM.

The visible feature may include a QR code, a credit meter, a payout meter, a service window, or a graphic displayed on a display screen of the EGM.

The method may further include transmitting a request to the EGM to display a predetermined graphic at an identified location on the EGM, generating a second image of the EGM that may include the identified location, and analyzing the second image of the EGM to determine if the predetermined graphic is displayed on the EGM at the identified location.

The method may further include transmitting the image to a remote host, and receiving the network address of the EGM from the remote host.

The method may further include visually augmenting the EGM by displaying an AR graphic to a user of the AR device on or near the EGM, and requesting confirmation from the user of the AR device that the user desires to pair the AR device with the visually augmented EGM.

The registration message and registration response may be transmitted over a wireless local area network (LAN).

The method may further include receiving a pairing code associated with the EGM over the wireless LAN, and transmitting the pairing code to the EGM over a second wireless network that is different from the wireless LAN.

The second wireless network may include a Bluetooth network, and wherein the pairing code may include a Bluetooth pairing code. The pairing code may be received from a remote host and/or the EGM.

The method may further include analyzing the image of the EGM to determine the network address of the EGM.

The method may further include determining a game state of the EGM based on the image, requesting game state information for a plurality of EGMs from a remote host, and comparing the game state of the EGM to the game state information for the plurality of EGMs to identify the EGM.

The method may further include sending a request to a remote host to cause the EGM to display a unique graphic, analyzing the image to determine that the unique graphic is being displayed by the EGM, and in response to determining that the unique graphic is being displayed by the EGM, obtaining the network address of the EGM from the remote host.

A method of pairing an augmented reality viewing device including a camera with an electronic gaming machine according to some embodiments includes sending an inquiry signal via a short range wireless communication link, receiving a response to the inquiry signal via the short range wireless communication link from the EGM, wherein the response may include a network address of the EGM on the short range wireless communication link, generating an image of the EGM using the camera, obtaining confirmation that a user of the AR device wishes to pair the AR device with the EGM in the image, and confirming based on the image that the EGM is the EGM that the user of the AR device wishes to pair with the AR device.

Obtaining confirmation that the user of the AR device wishes to pair the AR device with the EGM in the image may include visually augmenting the EGM by displaying an AR graphic to a user of the AR device on or near the EGM, and requesting confirmation from the user of the AR device that the user desires to pair the AR device with the visually augmented EGM.

Confirming based on the image that the EGM is the EGM that the user of the AR device wishes to pair with the AR device may include before generating the image, sending a request to the EGM to cause the EGM to display a unique graphic, and analyzing the image to determine that the unique graphic is being displayed by the EGM.

Confirming based on the image that the EGM is the EGM that the user of the AR device wishes to pair with the AR device may include determining a game state of the EGM from the image, requesting game state information for a plurality of EGMs from a remote host, and comparing the game state of the EGM to the game state information for the plurality of EGMs to identify the EGM.

A host computer system according to some embodiments includes a processor circuit, a memory coupled to the processor circuit, and a transceiver coupled to the processor circuit. The memory includes computer readable instructions that cause the processor circuit to receive, via the transceiver, an image of an EGM from the AR device, identify the EGM based on the image of the EGM, and transmit, via the transceiver, identity information regarding the EGM to the AR device.

A method, by a host computer system, of pairing an augmented reality viewing device including a camera with an electronic gaming machine according to some embodiments includes receiving an image of an EGM from the AR device, identifying the EGM based on the image of the EGM, and transmitting identity information regarding the EGM to the AR device.

The identity information may include a network address of the EGM. In some embodiments, the identity information may include a pairing code associated with the EGM. The method may further include sending the pairing code to the EGM.

The method may further include receiving a request from the AR device to cause the EGM to display a unique graphic, and in response to the request, sending a message to the EGM to display the unique graphic.

The method may further include receiving position and/or orientation information relating to the AR device from the AR device, wherein identifying the EGM based on the image of the EGM may include identifying the EGM based on the image of the EGM and the position and/or orientation information relating to the AR device.

The method may further include receiving a request from the AR device for game state information regarding a plurality of EGMs, determining game states of the plurality of EGMs, and transmitting the game states of the plurality of EGMs to the AR device.

An electronic gaming machine (EGM) according to some embodiments includes a processor circuit, a memory coupled to the processor circuit, and a transceiver coupled to the processor circuit. The memory includes computer readable instructions that cause the processor circuit to receive, via the transceiver, a request to display a confirmation graphic, display the confirmation graphic, receive, via the transceiver, a pairing request from the AR device, and pair with the AR device in response to the pairing request.

A method, by an electronic gaming machine, of pairing an augmented reality viewing device including a camera with the EGM according to some embodiments includes receiving a request to display a confirmation graphic, displaying the confirmation graphic, receiving a pairing request from the AR device, and pairing with the AR device in response to the pairing request.

Displaying the confirmation graphic may include displaying the confirmation graphic on a primary display screen of the EGM, a secondary display screen of the EGM, a credit meter, a win meter, and/or a service window.

The request may be received from a remote host that is separate from the AR device and/or from the AR device.

The method may further include receiving a first pairing code from a remote host, receiving a second pairing code from the AR device, comparing the first pairing code and the second pairing code, and paring with the AR device in response to the comparison.

The method may further include transmitting a first pairing code to the AR device via a first wireless network, receiving a second pairing code from the AR device via a second wireless network, comparing the first pairing code and the second pairing code, and paring with the AR device in response to the comparison.

Other EGM Features

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor circuit and memory devices. In such a "thick client" embodiment, the EGM local processor circuit executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor circuit of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor circuit of a general purpose computer, special purpose computer, or other programmable data processing apparatus to produce a machine, such that the instructions, which execute via the processor circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An augmented reality (AR) device, comprising:
   a processor circuit;
   a memory coupled to the processor circuit;
   a wireless transceiver coupled to the processor circuit; and
   a camera coupled to the processor circuit;
   wherein the memory comprises computer readable instructions that cause the processor circuit to:
   generate an image of a first plurality of electronic gaming machines (EGMs) using the camera;
   determine a current location of the AR device;
   access an EGM database comprising EGM data for a second plurality of EGMs, wherein each EGM of the second plurality of EGMs comprises a known location;
   based on the image of the first plurality of EGMs, identify a visible feature of a particular EGM of the first plurality of EGMs;
   based on the identified visible feature and the location of the AR device, compare the visible feature to the EGM data associated with a particular EGM of the second plurality of EGMs;
   based on the comparison, generate a correlation between the first plurality of EGMs in the image with the second plurality of EGMs in the EGM data;
   obtain, based on the correlation, a network address associated with a first EGM of the first plurality of EGMs;
   transmit a registration message using the wireless transceiver to the network address associated with the first EGM; and
   receive a registration response using the wireless transceiver from the first EGM in response to the registration message.

2. The AR device of claim 1, wherein the computer readable instructions that cause the processor circuit to generate the correlation further cause the processor circuit to:
   determine, based on the comparison, that a particular EGM of the second plurality of EGMs corresponds to the particular EGM of the first plurality of EGMs.

3. The AR device of claim 2, wherein the visible feature comprises a credit meter displayed on a display screen of the first EGM, wherein the credit meter comprises a current credit balance of a player playing at the first EGM, and
   wherein the comparison of the visible feature to the EGM data further comprises a comparison of the credit meter balance of the particular EGM of the first plurality of EGMs and a credit meter balance value in the EGM data associated with the particular EGM of the second plurality of EGMs.

4. The AR device of claim 1, wherein the visible feature is a predetermined graphic, and
   wherein the computer readable instructions further cause the processor circuit to:
   transmit a request to a particular EGM of the second plurality of EGMs to display the predetermined graphic at an identified location on the particular EGM of the second plurality of EGMs;
   generate a second image of the first EGM that comprises the identified location;
   analyze the second image of the first EGM to determine if the predetermined graphic is displayed on the first EGM at the identified location; and
   based on a determination that the predetermined graphic is displayed on the first EGM at the identified location, identify the predetermined graphic as the visible feature.

5. The AR device of claim 1, further comprising a pair of glasses.

6. The AR device of claim 1, further comprising an AR display, wherein the computer readable instructions further cause the processor circuit to:
   display an AR graphic on the AR display to visually augment the first EGM to a user of the AR device; and
   display an indication on the AR display requesting confirmation from the user of the AR device that the user desires to pair the AR device with the first EGM.

7. The AR device of claim 1, wherein the registration message and registration response are transmitted over a wireless local area network (LAN).

8. The AR device of claim 7, wherein the computer readable instructions further cause the processor circuit to:
   receive a pairing code associated with the first EGM over the wireless LAN; and
   transmit the pairing code to the first EGM over a second wireless network that is different from the wireless LAN.

9. The AR device of claim 8, wherein the second wireless network comprises a Bluetooth network, and wherein the pairing code comprises a Bluetooth pairing code.

10. The AR device of claim 1, wherein the computer readable instructions further cause the processor circuit to:
    analyze the image of the first plurality of EGMs to determine the network address of the first EGM.

11. The AR device of claim 1, wherein the computer readable instructions further cause the processor circuit to:
    determine a game state of the first EGM based on the image;
    request game state information for the second plurality of EGMs from a remote host; and compare the game state of the first EGM to the game state information for the second plurality of EGMs to identify the first EGM.

12. The AR device of claim 1, wherein the computer readable instructions further cause the processor circuit to:
send a request to a remote host to cause the first EGM to display a unique graphic;
analyze the image to determine that the unique graphic is being displayed by the first EGM; and
in response to determining that the unique graphic is being displayed by the first EGM, obtain the network address of the first EGM from the remote host.

13. A host computer system, comprising:
a processor circuit;
a memory coupled to the processor circuit; and
a transceiver coupled to the processor circuit;
wherein the memory comprises computer readable instructions that cause the processor circuit to:
receive, via the transceiver, an image of a plurality of electronic gaming machines (EGMs) from an augmented reality (AR) device, the image comprising a first feature of first EGM of the plurality of EGMs and a second feature of a second EGM of the plurality of EGMs;
identify the first EGM based on the first feature of the first EGM and the second feature of the second EGM in the image; and
transmit, via the transceiver, identity information regarding the first EGM to the AR device.

14. The host computer system of claim 13, wherein the computer readable instructions further cause the processor circuit to:
transmit a pairing code to the first EGM.

15. The host computer system of claim 13, wherein the computer readable instructions further cause the processor circuit to:
receive a request from the AR device to cause the first EGM to display a unique graphic; and
in response to the request, send a message to the first EGM to display the unique graphic.

16. The host computer system of claim 13, wherein the computer readable instructions further cause the processor circuit to:
receive position and orientation information relating to the AR device from the AR device,
wherein identifying the first EGM based on the first feature and the second feature in the image of the first EGM further comprises identifying the first EGM based on the first feature and the second feature in the image of the first EGM and the position and orientation information relating to the AR device.

17. The host computer system of claim 13, wherein the computer readable instructions further cause the processor circuit to:
receive a request from the AR device for game state information regarding the plurality of EGMs;
determine game states of the plurality of EGMs; and
transmit the game states of the plurality of EGMs to the AR device.

18. A method comprising:
generating an image of a first plurality of electronic gaming machines (EGMs) using a camera of an augmented reality (AR) device;
determining a current location of the AR device;
accessing an EGM database comprising EGM data for a second plurality of EGMs, wherein each EGM of the second plurality of EGMs comprises a known location;
based on the image of the first plurality of EGMs, determine a game state of a particular EGM of the first plurality of EGMs;
based on the determined game state and the location of the AR device, comparing the determined game state to a game state value of the EGM data associated with a particular EGM of the second plurality of EGMs;
based on the comparison, generating a correlation between the first plurality of EGMs in the image with the second plurality of EGMs in the EGM data;
obtaining, based on the correlation, a network address associated with a first EGM of the plurality of EGMs;
transmitting a registration message using a wireless transceiver of the AR device to the network address associated with the first EGM; and
receiving a registration response using the wireless transceiver from the first EGM in response to the registration message.

19. The method of claim 18, wherein generating the correlation further comprises:
identifying, from the image, a visible feature associated with the first EGM; and
determining that one of the second plurality of EGMs is associated with the visible feature.

20. The method of claim 19, wherein the visible feature comprises & game feature graphic displayed on a display screen of the first EGM, wherein the game feature graphic is indicative of a game state of a wagering game.

* * * * *